US012327915B2

(12) United States Patent
Abdelrahman et al.

(10) Patent No.: US 12,327,915 B2
(45) Date of Patent: Jun. 10, 2025

(54) Y-SHAPED SINGLE SUBSTRATE ULTRA-WIDEBAND ANTENNA AND ANTENNA ARRAY

(71) Applicant: Huawei Technologies Co., Ltd., Shenzhen (CN)

(72) Inventors: Ahmed Hassan Abdelaziz Abdelrahman, Cary, NC (US); Zhengxiang Ma, Summit, NJ (US)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 753 days.

(21) Appl. No.: 17/676,753

(22) Filed: Feb. 21, 2022

(65) Prior Publication Data

US 2022/0200159 A1 Jun. 23, 2022

Related U.S. Application Data

(63) Continuation of application No. PCT/US2019/047422, filed on Aug. 21, 2019.

(51) Int. Cl.

*H01Q 1/38* (2006.01)
*H01Q 1/42* (2006.01)
*H01Q 21/00* (2006.01)

(52) U.S. Cl.

CPC ........... *H01Q 21/0025* (2013.01); *H01Q 1/38* (2013.01); *H01Q 1/422* (2013.01)

(58) Field of Classification Search

None

See application file for complete search history.

(56) References Cited

U.S. PATENT DOCUMENTS

| | | | | |
|---|---|---|---|---|
| 9,485,037 | B1 * | 11/2016 | Weller | H01Q 9/32 |
| 2009/0256767 | A1 | 10/2009 | Kan et al. | |
| 2015/0263434 | A1 * | 9/2015 | Bench | H01Q 5/48 343/879 |

(Continued)

FOREIGN PATENT DOCUMENTS

| | | | |
|---|---|---|---|
| WO | 2006079993 | A1 | 8/2006 |

OTHER PUBLICATIONS

Novak, Markus H., et al., "Ultrawideband Antennas for Multiband Satellite Communications at UHF-Ku Frequencies," IEEE Transactions on Antennas and Propagation, vol. 63, No. 4, Apr. 3, 2015, 8 pages.

*Primary Examiner* — Wilson Lee
(74) *Attorney, Agent, or Firm* — Slater Matsil, LLP

(57) ABSTRACT

A modular wideband antenna includes a ground plane, a first antenna element and a second antenna element disposed on a first surface of a substrate, a first segment of the first antenna element extends parallel to a first segment of the second antenna element along the substrate and a second segment of the first element diverges from a second segment of the second antenna element along the substrate, the first antenna element having a first horizontal element electrically coupled to the second section of the first antenna element, and the second antenna element having a second horizontal element electrically coupled to the second section of the second antenna element, and a first wall and a second wall disposed on a second surface of the substrate, the first wall being capacitively coupled to the first antenna element and the second wall being electrically coupled to the second antenna element.

23 Claims, 19 Drawing Sheets

(56) References Cited

U.S. PATENT DOCUMENTS

| | | | | |
|---|---|---|---|---|
| 2018/0254541 | A1* | 9/2018 | Xiong | H01Q 1/243 |
| 2019/0348749 | A1* | 11/2019 | Thai | H01Q 9/0414 |
| 2020/0106177 | A1* | 4/2020 | Zhou | H01Q 5/378 |
| 2021/0036431 | A1* | 2/2021 | Wu | H01Q 1/52 |
| 2021/0313690 | A1* | 10/2021 | Morita | H01Q 17/001 |

* cited by examiner

700

710

740

750

FIG. 10B
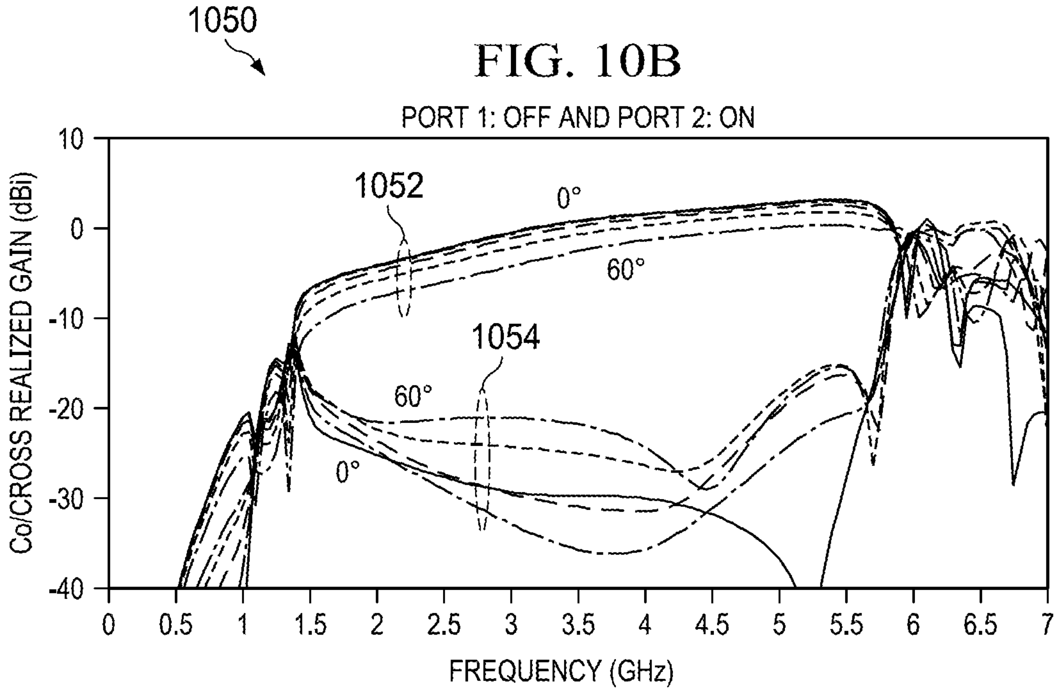
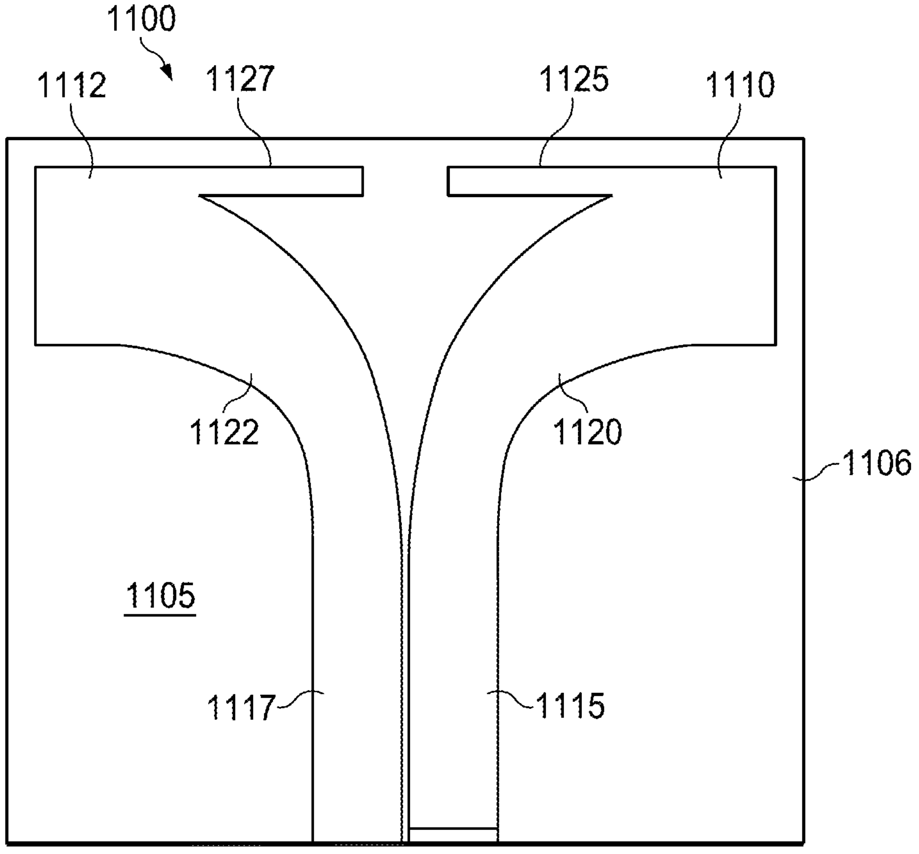
FIG. 11A

Y-SHAPED SINGLE SUBSTRATE ULTRA-WIDEBAND ANTENNA AND ANTENNA ARRAY

CROSS-REFERENCE TO RELATED APPLICATIONS

This application is a continuation of PCT Application Number PCT/US19/47422 filed on Aug. 21, 2019, and entitled "Y-Shaped Single Substrate Ultra-Wideband Antenna and Antenna Array," which application is incorporated herein by reference as if reproduced in its entirety.

TECHNICAL FIELD

The present disclosure relates generally to antennas, and, in particular embodiments, to a Y-shaped single substrate ultra-wideband (UWB) antenna and antenna array.

BACKGROUND

Tapered slot antennas (TSAs) have been widely used because of their ultra-wideband (UWB) capability and high gain features. A TSA consists of a tapered slot cut intending to gradually increase the antenna input impedance from the guided transmission line impedance to the free space impedance over a very wide bandwidth. However, conventional TSA arrays have high profile and poor cross-polarization when used for beam scanning. On the other hand, tightly coupled arrays (TCAs) are low profile antenna arrays that have demonstrated UWB capability and low cross polarization when used for beam scanning. TCAs are based on extending the effective length of the array elements through strong mutual coupling with neighbor elements, which in turn can imitate the conventional element lengths required for low frequency bands. However, conventional TCAs are usually loaded by thick superstrate material to enhance beam scanning and fed by an UWB balun to enable differential feeding for the dipole elements. Both TSAs and TCAs are good candidates for commercial sub-6 gigahertz (GHz) Fifth Generation (5G) applications, where single antenna architectures that cover the bandwidth from 700 megahertz (MHz) to 6 GHz (a 8.6:1 bandwidth ratio) have been proposed.

The design of UWB antennas is complex and requires specific techniques to overcome challenges, such as a need for an UWB balanced feed, to avoid spurious mode generation, to maintain antenna impedance matching when beam scanning, to keep cross coupling low between antenna radiation patterns (where the wide-angle scanning of phased arrays causes severe de-tuning and impedance mismatch, preventing practical application), and so on. Commonly available designs are not feasible for low-cost, high-volume commercial applications, as will be required for 5G wireless networks.

Therefore, there is a need for novel antenna and antenna array designs that overcome the design challenges and maintains the required specifications, as well as feature reduced design complexity to achieve low fabrication costs and small dimensions to enable small, lightweight commercial products.

SUMMARY

According to a first aspect, a modular wideband antenna is provided. The modular wideband antenna comprising a ground plane, a first antenna element and a second antenna element disposed on a first surface of a substrate, the first element is electrically coupled to the ground plane, a first segment of the first antenna element extends parallel to a first segment of the second antenna element along the substrate and a second segment of the first element diverges from a second segment of the second antenna element along the substrate, the second antenna element is coupled to a signal feed, the first antenna element has a first horizontal stub element electrically coupled to the second section of the first antenna element, and the second antenna element has a second horizontal stub element electrically coupled to the second section of the second antenna element, and a first wall and a second wall disposed on a second surface of the substrate, the first wall having a first end electrically coupled to the ground plane, the second wall having a first end electrically coupled to the ground plane, the first wall being capacitively coupled to the first antenna element and the second wall being electrically coupled to the second antenna element.

In a first implementation form of the modular wideband antenna according to the first aspect as such, the first horizontal element and the second horizontal stub element are horizontal stubs.

In a second implementation form of the modular wideband antenna according to the first aspect as such or any preceding implementation form of the first aspect, the horizontal stubs have constant width.

In a third implementation form of the modular wideband antenna according to the first aspect as such or any preceding implementation form of the first aspect, the first horizontal stub element and the second horizontal stub element being exponentially tapered, and form a gap with respective second sections.

In a fourth implementation form of the modular wideband antenna according to the first aspect as such or any preceding implementation form of the first aspect, the exponential taper of the first horizontal stub element and the second horizontal stub element matching an exponential taper of the second sections of the first antenna element and the second antenna element.

In a fifth implementation form of the modular wideband antenna according to the first aspect as such or any preceding implementation form of the first aspect, the first antenna element, the second antenna element, the first horizontal stub element, and the second horizontal stub element comprising a first metallization layer.

In a sixth implementation form of the modular wideband antenna according to the first aspect as such or any preceding implementation form of the first aspect, the first wall and the second wall comprising a second metallization layer.

In a seventh implementation form of the modular wideband antenna according to the first aspect as such or any preceding implementation form of the first aspect, the first element and the second element being substantially equal width.

In an eighth implementation form of the modular wideband antenna according to the first aspect as such or any preceding implementation form of the first aspect, the first horizontal element and the second horizontal element being substantially equal width.

In a ninth implementation form of the modular wideband antenna according to the first aspect as such or any preceding implementation form of the first aspect, the first wall and the second wall being substantially equal width.

In a tenth implementation form of the modular wideband antenna according to the first aspect as such or any preceding implementation form of the first aspect, the substrate being a single layer substrate.

According to a second aspect, an antenna array is provided. The antenna array comprising a ground plane, and a plurality of modular wideband antennas. Each modular wideband antenna comprising a first antenna element and a second antenna element disposed on a first surface of a substrate, the first element is electrically coupled to the ground plane, a first segment of the first antenna element extends parallel to a first segment of the second antenna element along the substrate and a second segment of the first element diverges from a second segment of the second antenna element along the substrate, the second antenna element being coupled to a signal feed, the first antenna element having a first horizontal stub element electrically coupled to the second section of the first antenna element, and the second antenna element having a second horizontal stub element electrically coupled to the second section of the second antenna element, and a first wall and a second wall disposed on a second surface of the substrate, the first wall being capacitively coupled to the first antenna element and the second wall being electrically coupled to the second antenna element.

In a first implementation form of the antenna array according to the second aspect as such, the antenna array comprising a single polarized array, and the first antenna element and the second antenna element being arranged in a plurality of parallel planes.

In a second implementation form of the antenna array according to the second aspect as such or any preceding implementation form of the second aspect, the antenna array comprising a dual polarized array, and the first elements and the second elements of a first subset of the plurality of modular wideband antennas being arranged in a plurality of first parallel planes, and the first elements and the second elements of a second subset of the plurality of modular wideband antennas being arranged in a plurality of second parallel planes.

In a third implementation form of the antenna array according to the second aspect as such or any preceding implementation form of the second aspect, the first parallel planes and the second parallel planes being orthogonal.

In a fourth implementation form of the antenna array according to the second aspect as such or any preceding implementation form of the second aspect, the first parallel planes and the second parallel planes being arranged along a diagonal of the ground plane.

In a fifth implementation form of the antenna array according to the second aspect as such or any preceding implementation form of the second aspect, the first walls of the first subset of the plurality of modular wideband antenna elements being electrically coupled to the second walls of the first subset of the plurality of modular wideband antenna elements, and the first walls of the second subset of the plurality of modular wideband antenna elements being electrically coupled to the second walls of the second subset of the plurality of modular wideband antenna elements.

In a sixth implementation form of the antenna array according to the second aspect as such or any preceding implementation form of the second aspect, the first walls and second walls of the first subset of the plurality of modular wideband antenna elements being electrically coupled to the first walls and second walls of the second subset of the plurality of modular wideband antenna elements.

In a seventh implementation form of the antenna array according to the second aspect as such or any preceding implementation form of the second aspect, the first walls and second walls of the first subset of the plurality of modular wideband antenna elements being electrically decoupled from the first walls and second walls of the second subset of the plurality of modular wideband antenna elements.

In an eighth implementation form of the antenna array according to the second aspect as such or any preceding implementation form of the second aspect, the first walls and second walls of the first subset of the plurality of modular wideband antenna elements being electrically coupled to the ground plane.

In a ninth implementation form of the antenna array according to the second aspect as such or any preceding implementation form of the second aspect, the substrate comprising a single layer substrate.

In a tenth implementation form of the antenna array according to the second aspect as such or any preceding implementation form of the second aspect, orientations of the substrates of the plurality of modular wideband antennas being diagonal to an orientation of the antenna array.

In an eleventh implementation form of the antenna array according to the second aspect as such or any preceding implementation form of the second aspect, the antenna array being fabricated using a three-dimensional printing process.

An advantage of a preferred embodiment is that the antenna is implementable on a single substrate, therefore, the antenna is simple to manufacture and is low cost. The antenna and antenna array are low profile and also do not require a thick superstrate or a metasurface, which further reduces manufacturing complexity and cost, as well as size, to enable small, lightweight commercial products.

Yet another advantage of a preferred embodiment is that a need for a balanced feeding balun is eliminated. This further reduces manufacturing complexity and cost, as well as size.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 10B illustrates a data plot of co-realized and cross-realized gain for the second signal with the second polarization when the first signal with the first polarization is inactive for a dual polarization antenna array comprising a plurality of single layer substrate antennas with tapered horizontal elements according to example embodiments presented herein;

FIGS. 11A and 11B illustrate views of a first example single layer substrate antenna where exponentially tapered second segments of the single layer substrate antenna have different exponential tapers according to example embodiments presented herein;

DETAILED DESCRIPTION OF ILLUSTRATIVE EMBODIMENTS

The specific embodiments discussed below are merely illustrative of specific embodiments, and are not intended to limit the scope of the disclosure or appended claims.

Figure 1A:
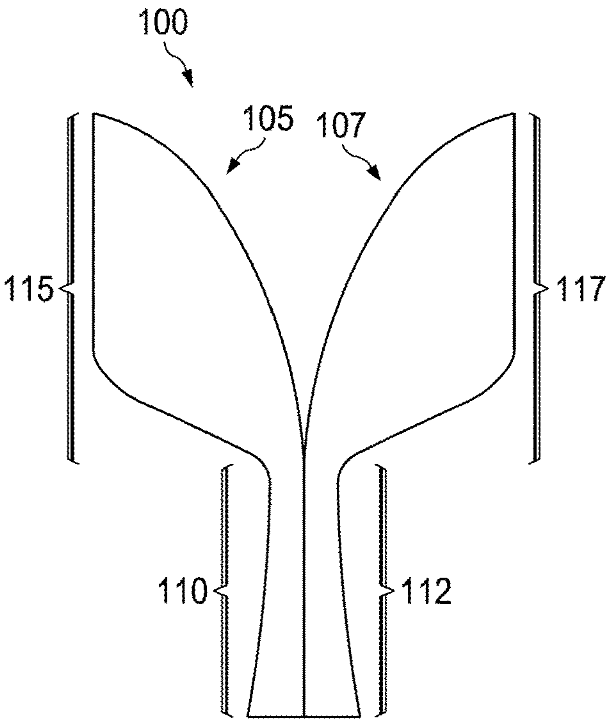
FIG. 1A (PRIOR ART)
FIGS. 1A-1D illustrate prior art ultra-wideband (UWB) antenna elements.
Figure 1B:
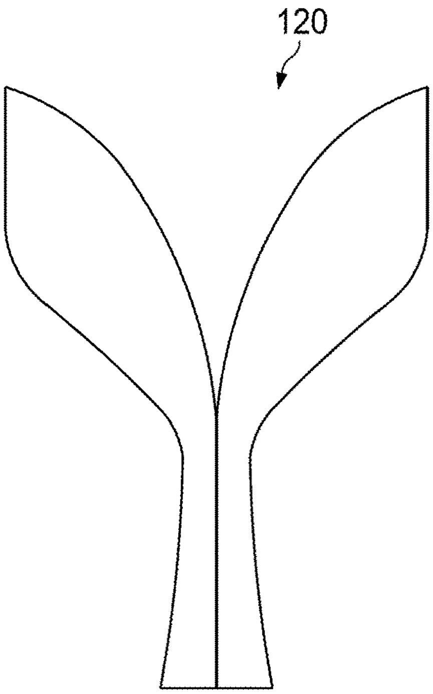
FIG. 1B (PRIOR ART)
Figure 1C:
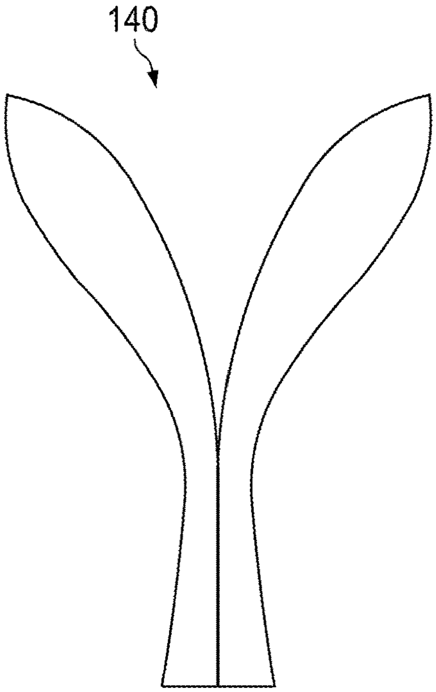
FIG. 1C (PRIOR ART)
Figure 1D:
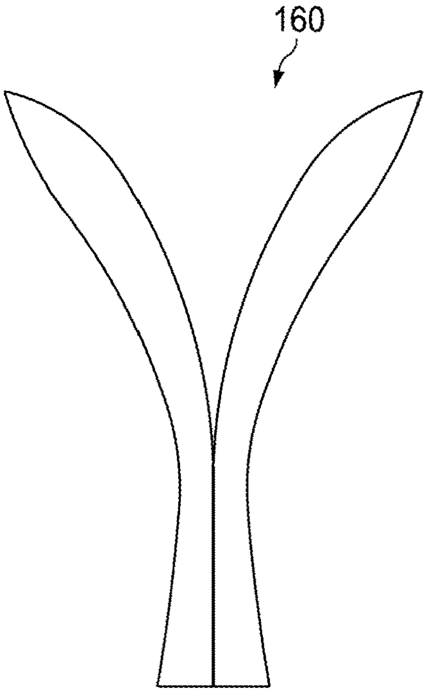
FIG. 1D (PRIOR ART)

FIGS. 1A-1D illustrate prior art ultra-wideband (UWB) antenna elements. FIG. 1A illustrates a prior art UWB antenna element 100. UWB antenna element 100 includes a first element 105 and a second element 107. First element 105 includes a first segment no and a second segment 115. Similarly, second element 107 includes a first segment 112 and a second segment 117. First segment no of first element 105 and first segment 112 of second element 107 are separated by a gap. Second segment 115 of first element 105 and second segment 117 of second element 107 are exponentially tapered. The second segments may have the same exponential taper on both edges or the two edges of each segment may have differing exponential taper. First element 105 and second element 107 may be formed on a single metallization layer or on different metallization layers. FIGS. 1B-1D illustrate prior art UWB antenna elements 120, 140, and 160 that are similar to UWB antenna element 100 but with second segments having different exponential tapers.

According to an example embodiment, as described below in connection with FIGS. 2A, 2B, and 3, an antenna, with an unbalanced feed, that is formed on a single layer substrate is presented. The antenna has antenna elements formed on both sides of the single layer substrate, with no metallization internal to the single layer substrate. The unbalanced feed eliminates the need for a balun, thereby simplifying the design of the antenna. For example, the antenna is fed directly from a 50 ohm connector without matching circuitry below the ground plane. The antenna features horizontal stub elements that reduce cross polarization when the antenna is being used for beam scanning. The horizontal stub elements may also be referred to as horizontal extension elements.

Figure 2A:
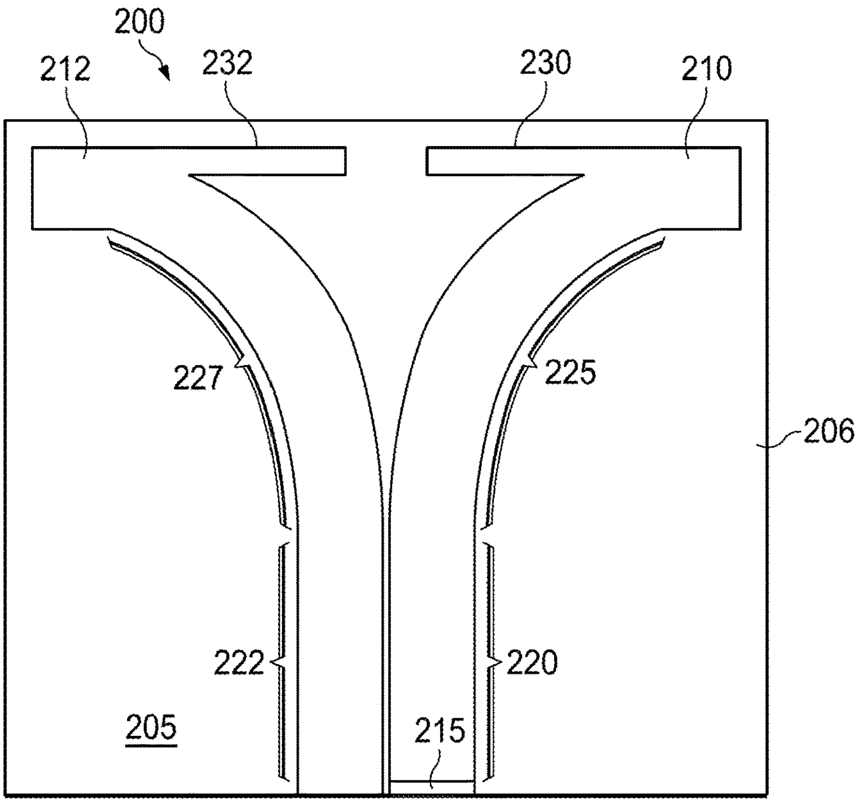
FIG. 2A illustrates a first view of a single layer substrate antenna according to example embodiments presented herein.

FIG. 2A illustrates a first view of a single layer substrate antenna 200 of an example embodiment. The first view displays the components of single layer substrate antenna 200 disposed on a first surface 206 of a substrate 205. Single layer substrate antenna 200 may an example of a tapered slot antenna. On the first surface 206 of substrate 205, single layer substrate antenna 200 comprises a first antenna element 210 and a second antenna element 212. First antenna element 210 is electrically coupled to a signal feed 215, while second antenna element 212 is coupled to a ground plane. Signal feed 215 may be electrically coupled to first antenna element 210 through a hole in the ground plane, for example.

First antenna element 210 includes a first segment 220 and a second segment 225. Second antenna element 212 includes a first segment 222 and a second segment 227. There is a gap between first segment 220 of first antenna element 210 and first segment 222 of second antenna element 212. Additionally, first segment 220 of first antenna element 210 and first segment 222 of second antenna element 212 may be parallel to each other. Furthermore, second segment 225 of first antenna element 210 has a first exponential taper, and second segment 227 of second antenna element 212 has a second exponential taper. A segment (or element) having an exponential taper means that the change in the segment or element may be described with an exponential function. In an embodiment, second segment 225 of first antenna element 210 and second segment 227 of second antenna element 212 diverge from each other. In an embodiment, the first and second exponential tapers are substantially equal. In an example embodiment, the top and bottom edge of each second segment have the same exponential taper. In another embodiment, the top and bottom edge of each second segment have different exponential tapers. In yet another embodiment, the second segments of the first and second antenna elements have different exponential tapers.

First antenna element 210 further includes a first horizontal stub element 230 with a first end electrically coupled to second segment 225. Second antenna element 212 further includes a second horizontal stub element 232 with a first end electrically coupled to second segment 227. The horizontal stub elements help in reducing cross-polarization when scanning by increasing the horizontal current in the antenna elements. In an embodiment, first horizontal stub element 230 and second horizontal element 232 are arranged so that second ends of the horizontal stub elements are oriented towards a midline of single layer substrate antenna 200. In an embodiment, first horizontal stub element 230 and second horizontal stub element 232 have constant thickness. In another embodiment, first horizontal stub element 230 and second horizontal stub element 232 have equal thickness. In an embodiment, each antenna element comprises more than one horizontal stub elements. The first and second horizontal stub elements may also be referred to as horizontal extensions.

Figure 2B:
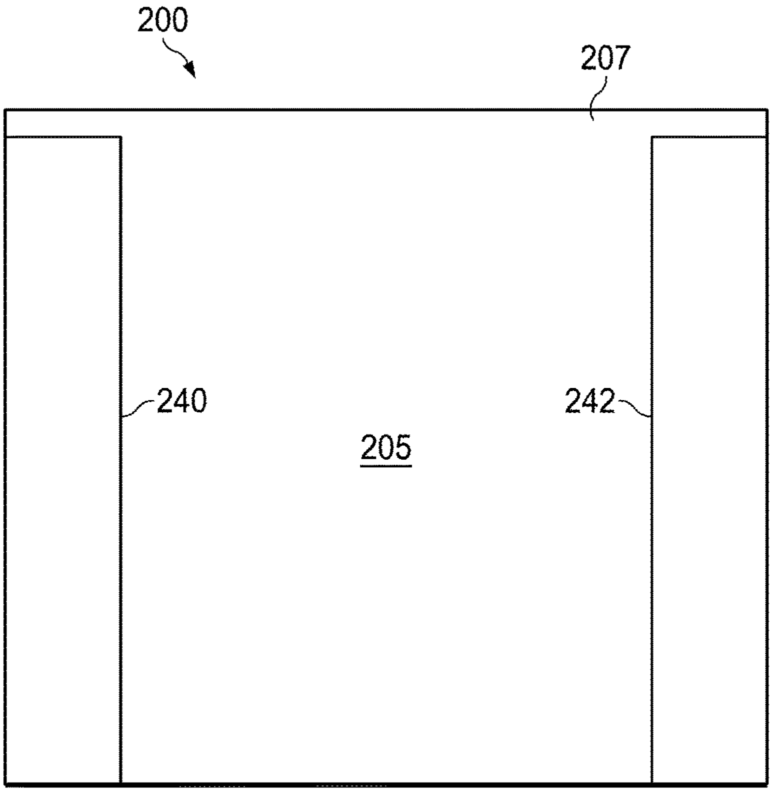
FIG. 2B illustrates a second view of single layer substrate antenna according to example embodiments presented herein.

FIG. 2B illustrates a second view of single layer substrate antenna 200 of an example embodiment. The second view displays the components of antenna 200 disposed on a second surface 207 of substrate 205. On the second surface 207 of substrate 205, antenna 200 comprises a first wall 240 and a second wall 242. First and second walls 240 and 242 may be referred to as coupling walls. First wall 240 and second wall 242 have first ends that are electrically coupled to the ground plane. First wall 240 and second wall 242 are sufficiently tall so that they are at least as tall as first antenna element 210 and second antenna element 212 formed on the first surface of substrate 205. First wall 240 and second wall 242 have second ends that are capacitively coupled to first antenna element 210 and second antenna element 212, respectively.

The antenna elements (shown in FIG. 2A, for example) and the walls (shown in FIG. 2B, for example) are tightly coupled through the capacitance generated between them. The capacitive coupling between the antenna elements and the walls help to eliminate spurious resonance without having to utilize internal metallization in the substrate. The walls are also used to avoid the generation of common modes within the operating frequency band.

Figure 3:
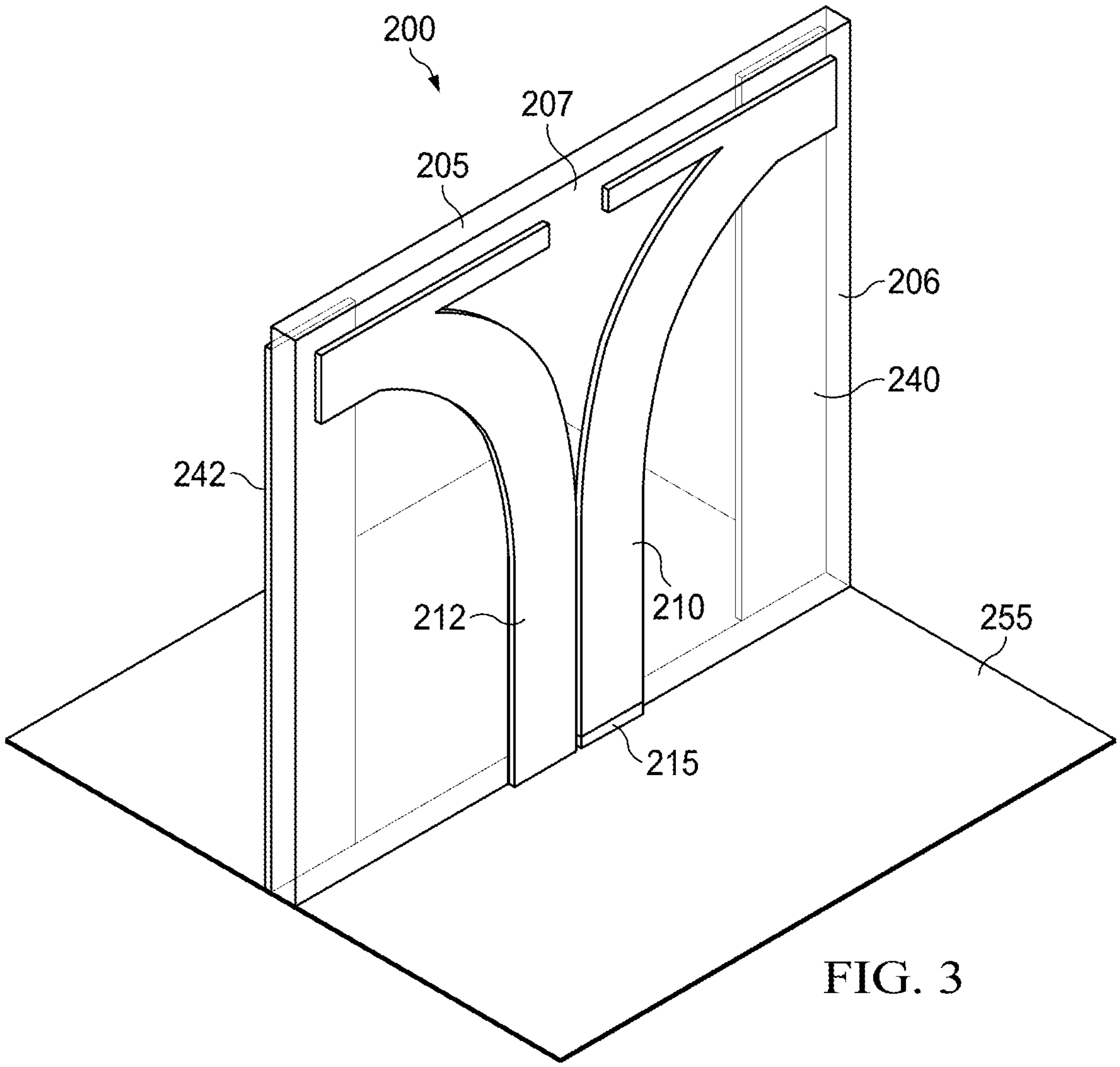
FIG. 3 illustrates an isometric view of single layer substrate antenna according to example embodiments presented herein.

FIG. 3 illustrates an isometric view of single layer substrate antenna 200. As shown in FIG. 3, single layer substrate antenna 200 is disposed on a ground plane 255, and includes first antenna element 210 and second antenna element 212 on the first surface 206 of substrate 205, as well as first wall 240 and second wall 242 on the second surface 207 of substrate 205. A superstrate or metasurface is not required. Furthermore, the design of antenna 200 is compatible with single substrate fabrication with no internal metallization, which helps to reduce fabrication costs.

In an embodiment, the elements of the single layer substrate antenna, such as the antenna elements, the horizontal stub elements, and the walls are formed from conductive metal, such as low loss metals (including copper, aluminum, etc.).

Figure 4A:
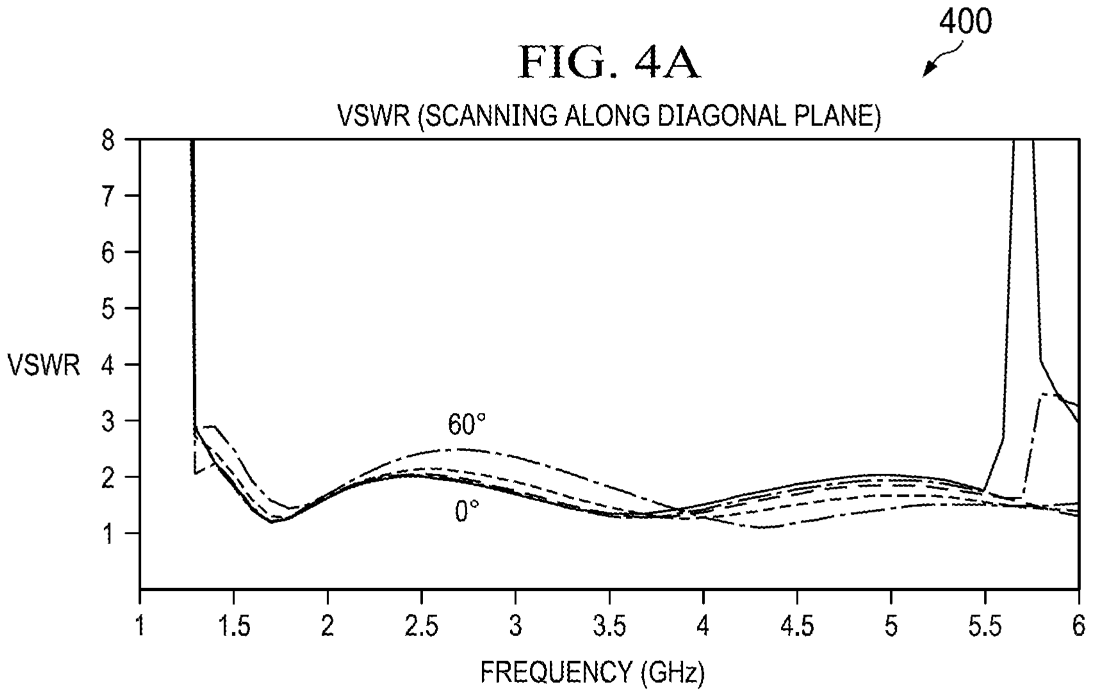
FIG. 4A illustrates a data plot of voltage standing wave ratio (VSWR) versus frequency for the single layer substrate antenna according to example embodiments presented herein.

FIG. 4A illustrates a data plot 400 of voltage standing wave ratio (VSWR) versus frequency for the single layer substrate antenna, as shown in FIGS. 2A, 2B, and 3. Data plot 400 displays the VSWR for angles ranging from −60 to +60 degrees with scanning being performed along a diagonal plane, showing that the VSWR for the single layer substrate antenna remains relatively constant from approximately 1.3 GHz to 5.5 GHz for the entirety of the angle range.

Figure 4B:
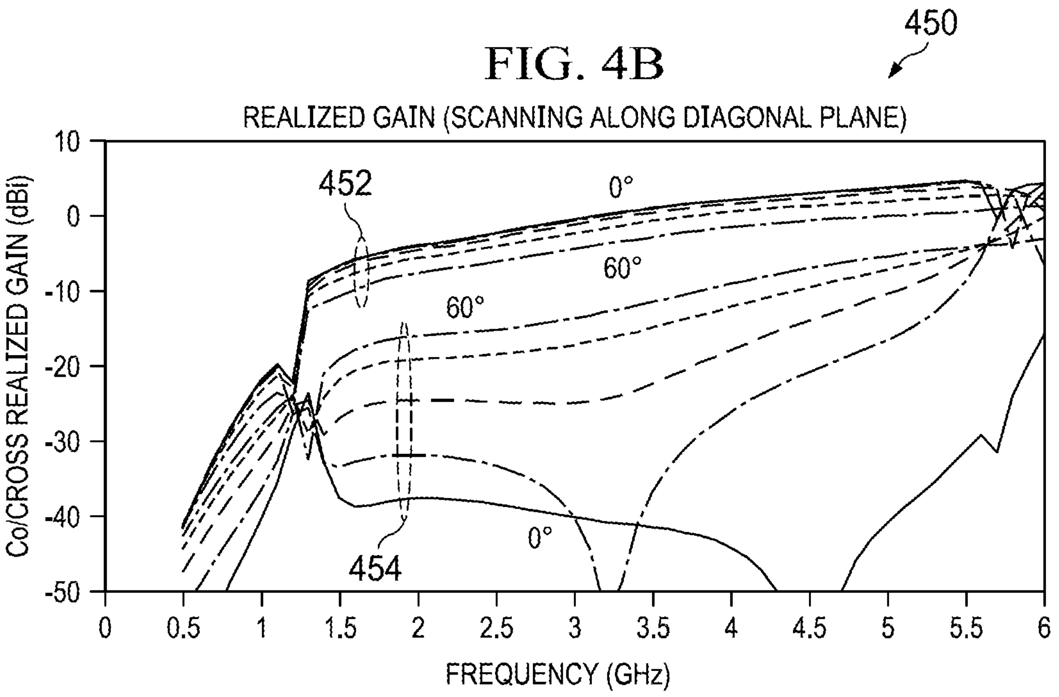
FIG. 4B illustrates a data plot of co-realized and cross-realized gain for the single layer substrate antenna according to example embodiments presented herein.

FIG. 4B illustrates a data plot 450 of co-realized and cross-realized gain for the single layer substrate antenna. As shown in FIG. 4B, a first set of curves 452 represents co-realized gain for angles −60 to +60 degrees with scanning being performed along a diagonal plane, while a second set of curves 454 represents cross-realized gain for angles −60 to +60 degrees with scanning again being performed along a diagonal plane. Cross-realized gain ranges from 10 to 40 dB less than co-realized gain over the frequency range.

According to an example embodiment, as described below in connection with FIGS. 5A, 5B, and 6, an antenna array formed from a plurality of single layer substrate antennas is provided. In an embodiment, the antenna array is a single polarization antenna array. In the single polarization array, the antenna elements of the single layer substrate antennas are arranged in a plurality of parallel planes, for example. In an embodiment, the antenna is a dual polarization antenna array. In the dual polarization array, the antenna elements of a first subset of the plurality of single layer substrate antennas is arranged in a plurality of first parallel planes and then antenna elements of a second subset of the plurality of single layer substrate antennas is arranged in a plurality of second parallel planes, for example. In an embodiment, the first parallel planes and the second parallel planes are orthogonal planes. In an embodiment, the first parallel planes and the second parallel planes are orthogonal planes arranged in a diagonal layout. The diagonal layout helps to stabilize scanning performance.

The design of the single layer substrate antenna enables the easy arrangement of the antennas into antenna arrays. In an embodiment, in a single polarization antenna array, the antennas may be butted end to end and arranged in parallel planes. In an embodiment, in a dual polarization antenna array, a first subset of the antennas may be butted end to end and a second subset of the antennas may be butted end to end, and grooves are formed in the substrates so that the substrates may be arranged in an interlocking and orthogonal manner. In an embodiment, the walls of the antennas are electrically coupled.

Figure 5A:
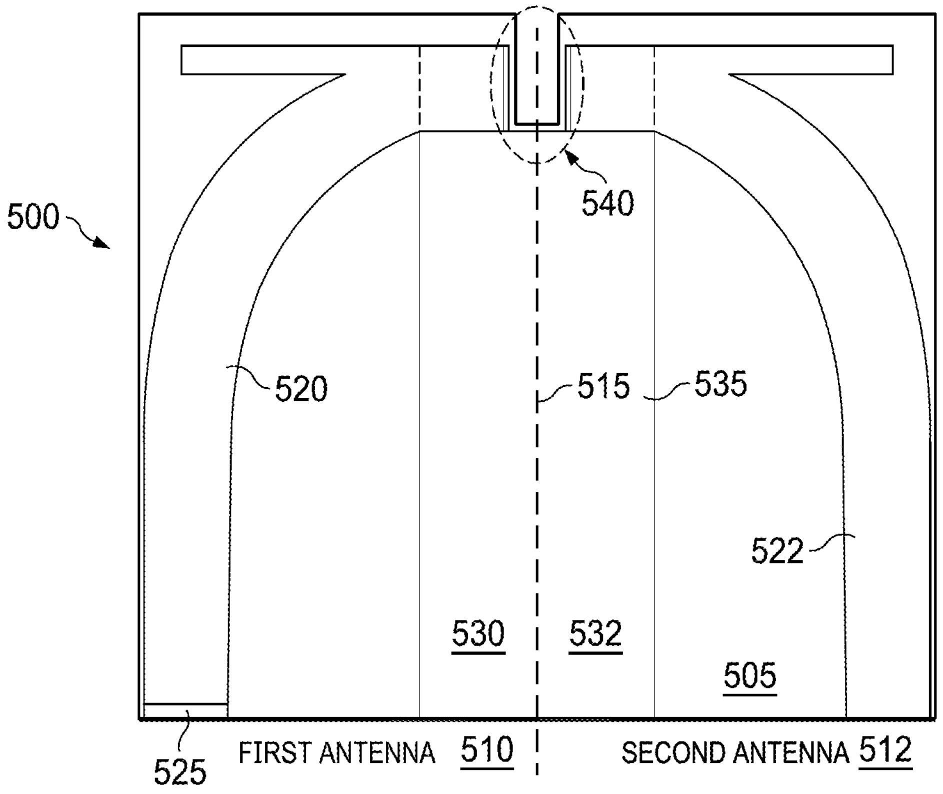
FIG. 5A illustrates a view of a portion of a dual polarization antenna array comprising a first subset of a plurality of single layer substrate antennas arranged in a plurality of first parallel planes according to example embodiments presented herein.

FIG. 5A illustrates a view of a portion of a dual polarization antenna array 500 comprising a first subset of a plurality of single layer substrate antennas arranged in a plurality of first parallel planes. The view of the portion of the dual polarization antenna array 500 presents both surfaces (e.g., opposite surfaces, such as a distal surface and a mesial surface) of substrate 505, displaying antenna elements and walls present on both surfaces of substrate 505. The view of the portion of the dual polarization antenna array 500 displays a part of a first antenna 510 and a part of a second antenna 512, where first antenna 510 and second antenna 512 are as shown in FIGS. 2A, 2B, and 3, for example. A vertical dashed line 515 represents the separation between first antenna 510 and second antenna 512.

The portion of dual polarization antenna array 500 includes a first antenna element 520, which is electrically coupled to signal feed 525, and a second antenna element 522 which is electrically coupled to the ground plane. The portion of dual polarization antenna array 500 also includes a first wall 530 and a second wall 532. As shown in FIG. 5A, first wall 530 and second wall 532 are electrically coupled, forming a single large wall 535. In an embodiment, first wall 530 and second wall 532 are electrically decoupled. The portion of dual polarization antenna array 500 further includes a notch 540 that allows a corresponding portion of dual polarization antenna array comprising a second subset of a plurality of single layer substrate antennas arranged in a plurality of second parallel planes (an example is presented in FIG. 5B) to be fitted into an interlocking and orthogonal manner.

Figure 5B:
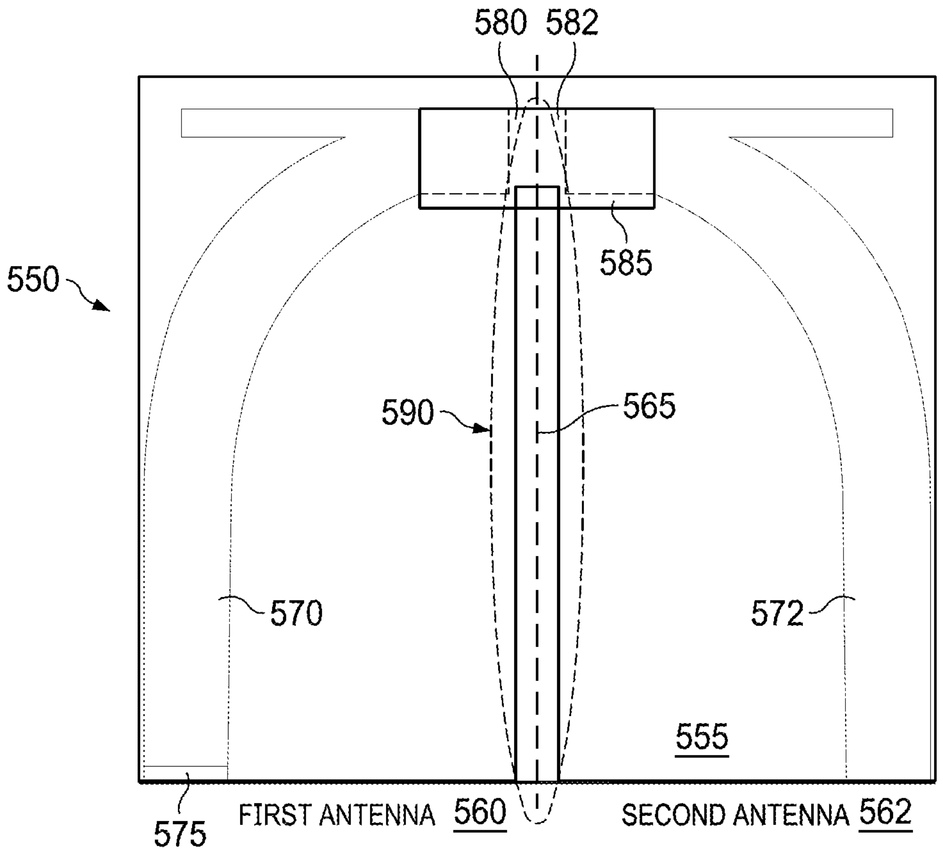
FIG. 5B illustrates a view of a portion of a dual polarization antenna array comprising a second subset of a plurality of single layer substrate antennas arranged in a plurality of second parallel planes according to example embodiments presented herein.

FIG. 5B illustrates a view of a portion of a dual polarization antenna array 550 comprising a second subset of a plurality of single layer substrate antennas arranged in a plurality of second parallel planes. The view of the portion of the dual polarization antenna array 550 presents both surfaces (e.g., opposite surfaces, such as a distal surface and a mesial surface) of substrate 555, displaying antenna elements and walls present on both surfaces of substrate 555. The view of the portion of the dual polarization antenna array 550 displays a part of a first antenna 560 and a part of a second antenna 562, where first antenna 560 and second antenna 562 are as shown in FIGS. 2A, 2B, and 3, for example. A vertical dashed line 565 represents the separation between first antenna 560 and second antenna 562.

The portion of dual polarization antenna array 550 includes a first antenna element 570, which is electrically coupled to signal feed 575, and a second antenna element 572 which is electrically coupled to the ground plane. The portion of dual polarization antenna array 550 also includes a first wall 580 and a second wall 582. As shown in FIG. 5B, first wall 580 and second wall 582 are electrically coupled, forming a single large wall 585. However, large wall 585 (hence, first wall 580 and second wall 582) is not electrically coupled to the ground plane as in the single layer substrate antennas shown in FIGS. 2A, 2B, and 3. However, large wall 585 is electrically coupled to large wall 535, which is electrically coupled to the ground plane. The electrical coupling between large wall 585 and large wall 535 helps to avoid common modes at low frequencies. In an embodiment, first wall 580 and second wall 582 are electrically decoupled. The portion of dual polarization antenna array 550 further includes a notch 590 that allows a corresponding portion of dual polarization antenna array comprising the first subset of a plurality of single layer substrate antennas arranged in a plurality of first parallel planes (an example is presented in FIG. 5A) to be fitted into an interlocking and orthogonal manner. As an example, the portion of dual polarization antenna array 550 shown in FIG. 5B may slide over the portion of dual polarization antenna array 500 shown in FIG. 5A, with slot 590 fitting over and into slot 540 and form an interlocking and orthogonal antenna. An example is shown in FIG. 6.

Figure 6:
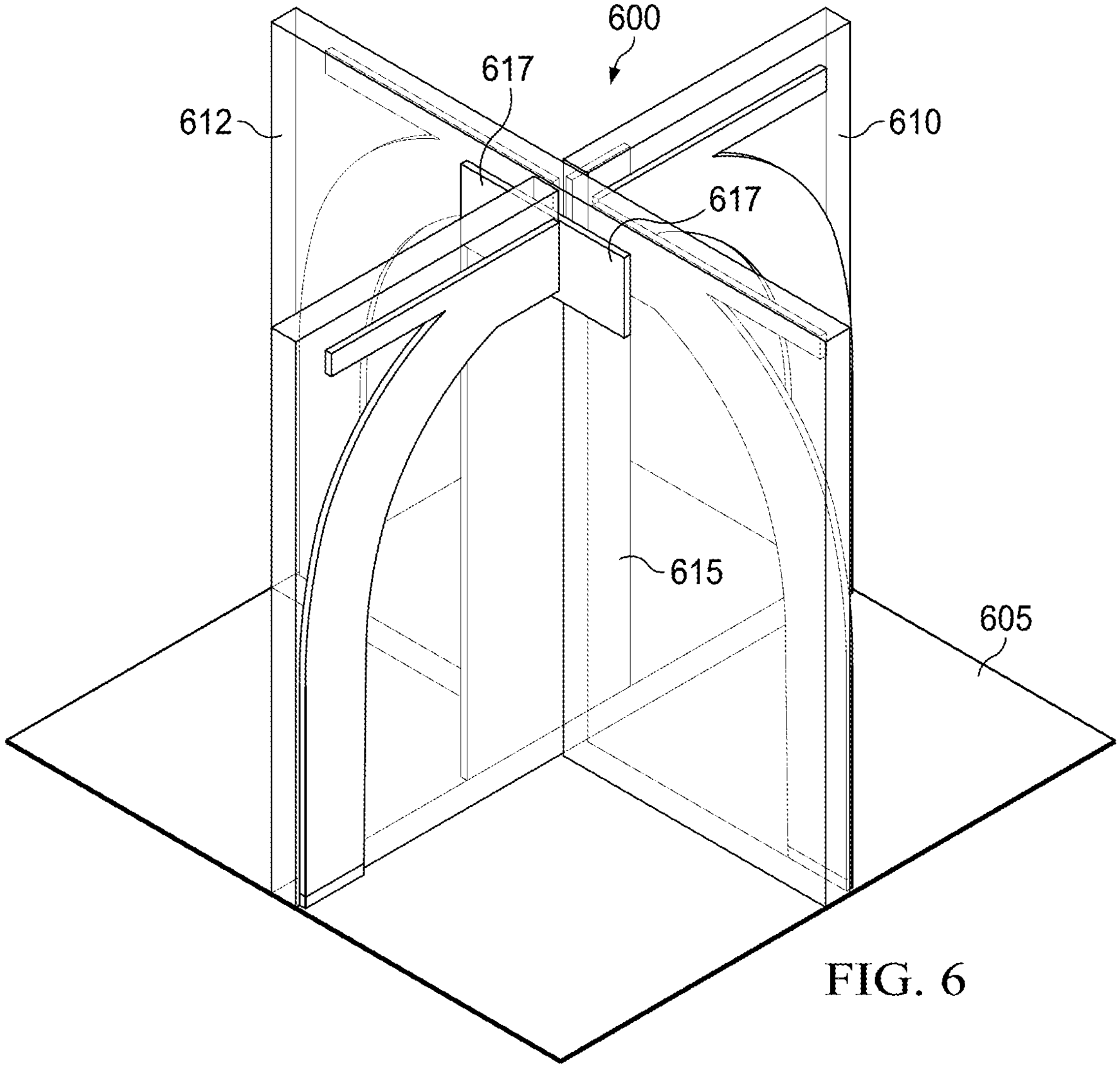
FIG. 6 illustrates an isometric view of a portion of a dual polarization antenna array according to example embodiments presented herein.

FIG. 6 illustrates an isometric view of a portion of a dual polarization antenna array 600. As shown in FIG. 6, the portion of the dual polarization antenna array 600 includes a ground plane 605. On ground plane 605, a portion 610 of a plurality of single layer substrate antennas arranged in a plurality of first parallel planes is arranged in an interlocking and orthogonal manner with a portion 612 of a plurality of single layer substrate antennas arranged in a plurality of second parallel planes. A large wall 615 of portion 610 is electrically coupled to a large wall 617 of portion 612.

Figure 7A:
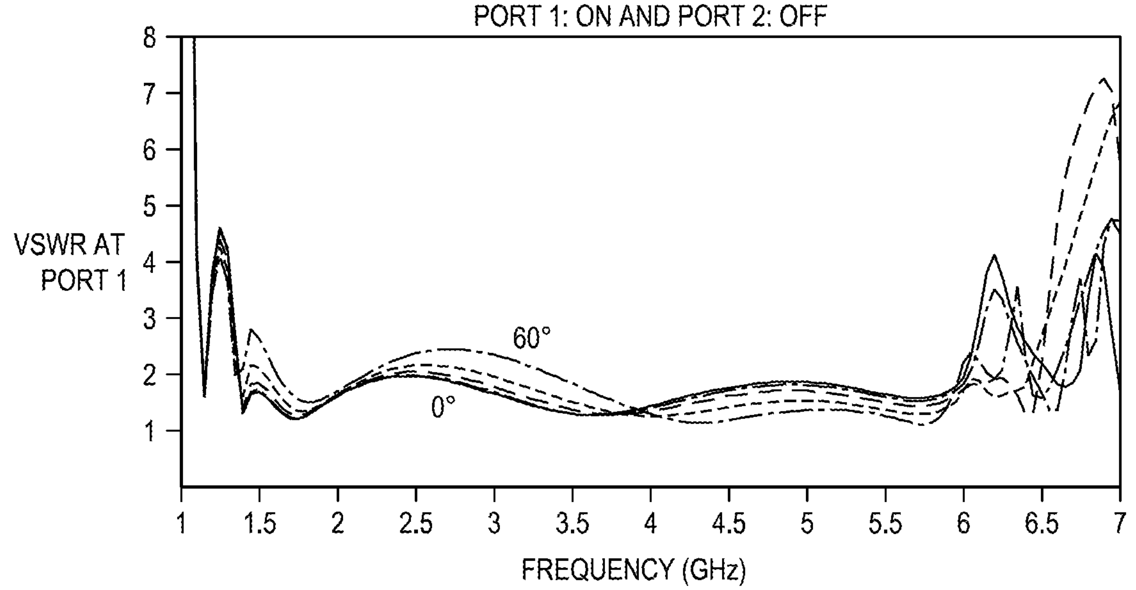
FIG. 7A illustrates a data plot of VSWR for a first signal with a first polarization when a second signal with a second polarization is inactive for a dual polarization antenna array comprising a plurality of single layer substrate antennas according to example embodiments presented herein.

FIG. 7A illustrates a data plot 700 of VSWR for a first signal with a first polarization when a second signal with a second polarization is inactive for a dual polarization antenna array comprising a plurality of single layer substrate antennas. Data plot 700 displays the VSWR for the first signal with angles ranging from −60 to +60 degrees with scanning being performed along a diagonal plane, showing that the VSWR remains relatively flat from approximately 1.5 GHz to 6 GHz for the entirety of the angle range.

Figure 7B:
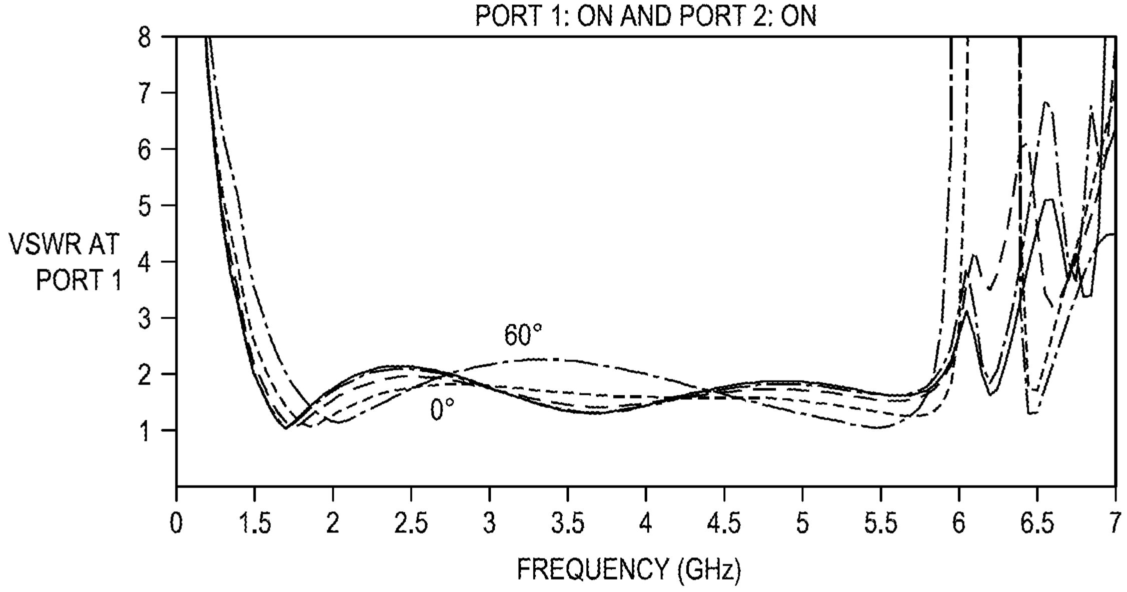
FIG. 7B illustrates a data plot of VSWR for the first signal with the first polarization when the second signal with the second polarization is active for a dual polarization antenna array comprising a plurality of single layer substrate antennas according to example embodiments presented herein.

FIG. 7B illustrates a data plot 710 of VSWR for the first signal with the first polarization when the second signal with the second polarization is active for a dual polarization antenna array comprising a plurality of single layer substrate antennas. Data plot 710 displays the VSWR for the first signal with angles ranging from −60 to +60 degrees with scanning being performed along a diagonal plane, showing that the VSWR remains relatively flat from approximately 1.5 GHz to 6 GHz for the entirety of the angle range, even when the second signal is active.

Figure 7C:
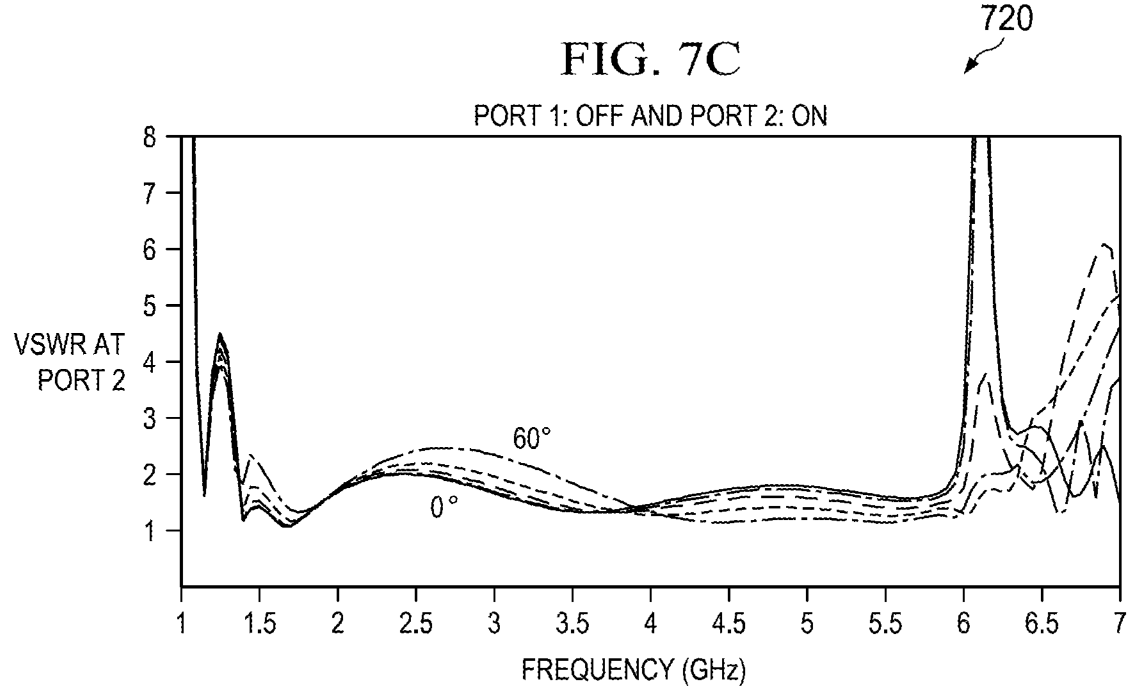
FIG. 7C illustrates a data plot of VSWR for the second signal with the second polarization when the first signal with the first polarization is inactive for a dual polarization antenna array comprising a plurality of single layer substrate antennas according to example embodiments presented herein.

FIG. 7C illustrates a data plot 720 of VSWR for the second signal with the second polarization when the first signal with the first polarization is inactive for a dual polarization antenna array comprising a plurality of single layer substrate antennas. Data plot 720 displays the VSWR for the second signal with angles ranging from −60 to +60 degrees with scanning being performed along a diagonal plane, showing that the VSWR remains relatively flat from approximately 1.5 GHz to 6 GHz for the entirety of the angle range.

Figure 7D:
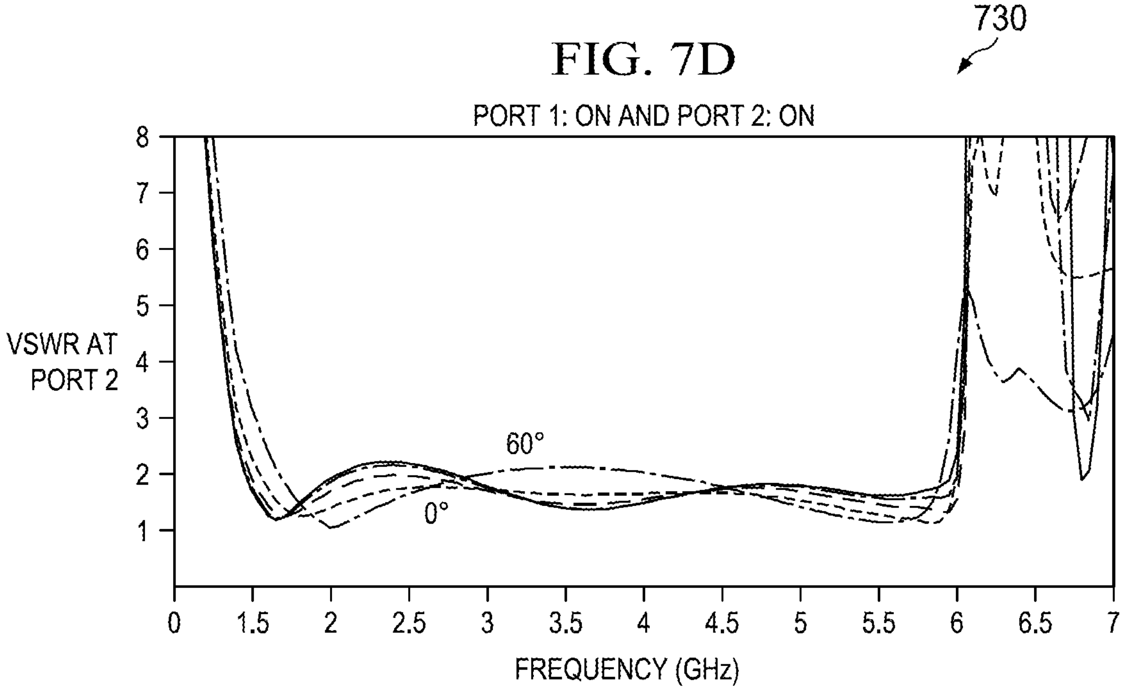
FIG. 7D illustrates a data plot of VSWR for the second signal with the second polarization when the first signal with the first polarization is active for a dual polarization antenna array comprising a plurality of single layer substrate antennas according to example embodiments presented herein.

FIG. 7D illustrates a data plot 730 of VSWR for the second signal with the second polarization when the first signal with the first polarization is active for a dual polarization antenna array comprising a plurality of single layer substrate antennas. Data plot 730 displays the VSWR for the second signal with angles ranging from −60 to +60 degrees with scanning being performed along a diagonal plane, showing that the VSWR remains relatively flat from approximately 1.5 GHz to 6 GHz for the entirety of the angle range, even when the first signal is active.

Figure 7E:
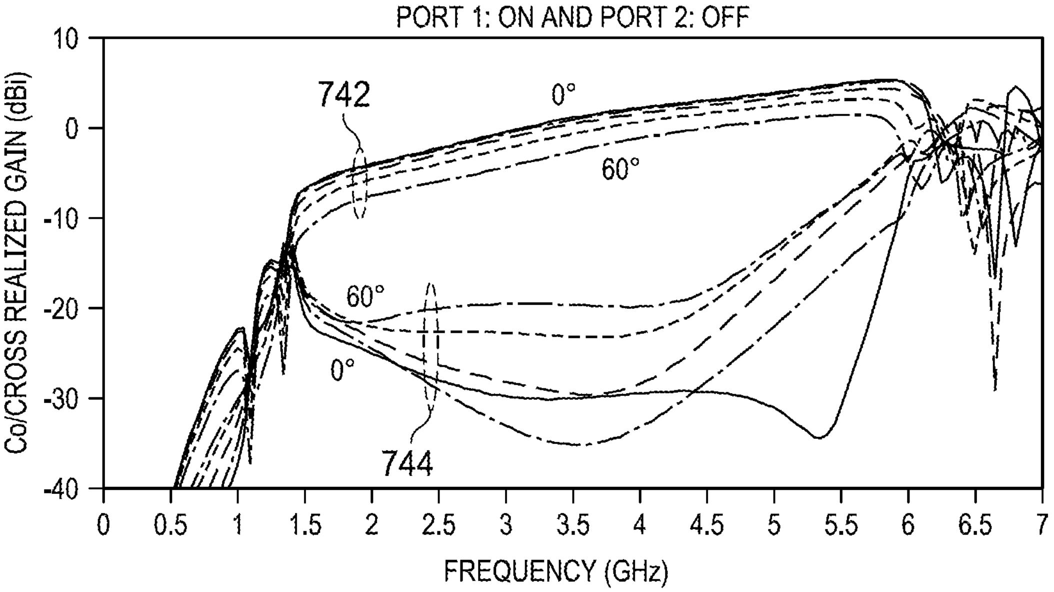
FIG. 7E illustrates a data plot of co-realized and cross-realized gain for the first signal with the first polarization when the second signal with the second polarization is inactive for a dual polarization antenna array comprising a plurality of single layer substrate antennas according to example embodiments presented herein.

FIG. 7E illustrates a data plot 740 of co-realized and cross-realized gain for the first signal with the first polarization when the second signal with the second polarization is inactive for a dual polarization antenna array comprising a plurality of single layer substrate antennas. As shown in FIG. 7E, a first set of curves 742 represents co-realized gain for angles −60 to +60 degrees with scanning being performed along a diagonal plane, while a second set of curves 744 represents cross-realized gain for angles −60 to +60 degrees with scanning being performed along a diagonal plane. Cross-realized gain ranges from 10 to 40 dB less than co-realized gain over the frequency range.

Figure 7F:
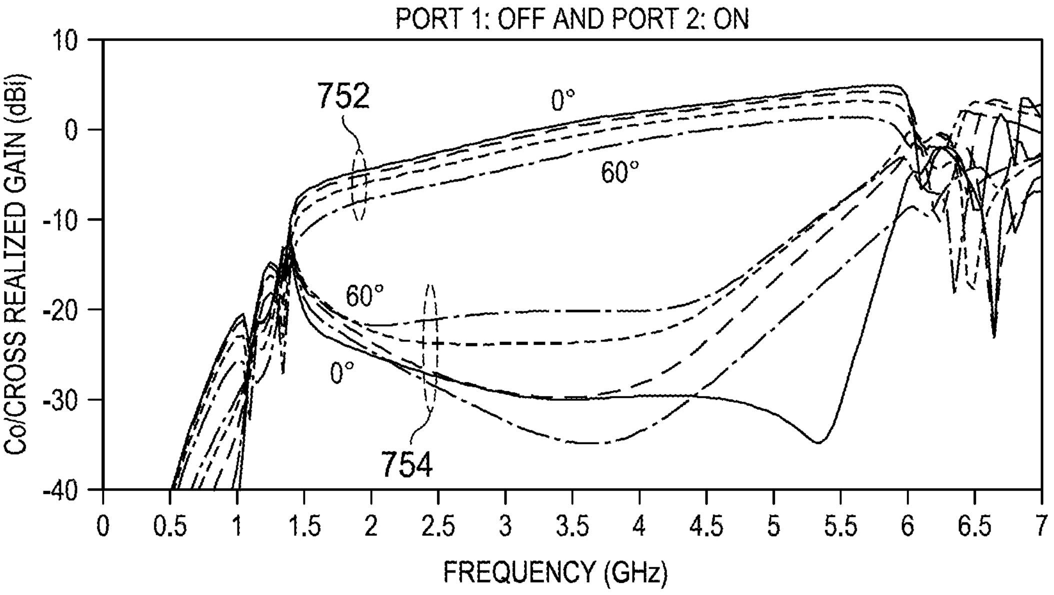
FIG. 7F illustrates a data plot of co-realized and cross-realized gain for the second signal with the second polarization when the first signal with the first polarization is inactive for a dual polarization antenna array comprising a plurality of single layer substrate antennas according to example embodiments presented herein.

FIG. 7F illustrates a data plot 750 of co-realized and cross-realized gain for the second signal with the second polarization when the first signal with the first polarization is inactive for a dual polarization antenna array comprising a plurality of single layer substrate antennas. As shown in FIG. 7F, a first set of curves 752 represents co-realized gain for angles −60 to +60 degrees with scanning being performed along a diagonal plane, while a second set of curves 754 represents cross-realized gain for angles −60 to +60 degrees with scanning being performed along a diagonal plane. Cross-realized gain ranges from 10 to 40 dB less than co-realized gain over the frequency range.

In an embodiment, the walls of the antennas are electrically decoupled. In such an embodiment, the large walls formed by abutting antenna elements, when arranged in an interlocking and orthogonal manner, are electrically decoupled.

According to an example embodiment, as described below in connection with FIGS. 8A, 8B, and 9, the horizontal stub elements of a single layer substrate antenna or antenna array are exponentially tapered. The exponentially tapered horizontal stub segments help to improve cross-realized gain. In an embodiment, the exponential taper of the horizontal elements matches that of the exponential taper of the second segments of the antenna elements, thereby maintaining a gap between the horizontal stub element and the second segment. In an embodiment, the gap is constant for the length of the horizontal stub element. In an embodiment, the exponential taper of the horizontal stub element differs from the exponential taper of the second segment.

Figure 8A:
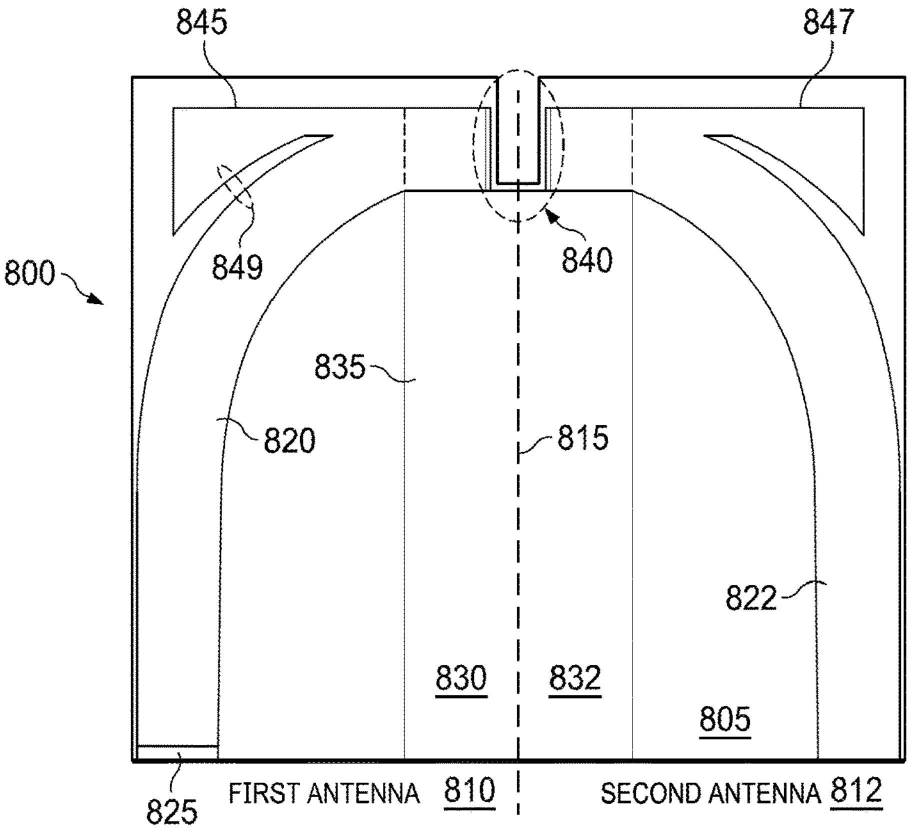
FIG. 8A illustrates a view of a portion of a dual polarization antenna array comprising a first subset of a plurality of single layer substrate antennas with exponentially tapered horizontal stub elements, with the antennas arranged in a plurality of first parallel planes according to example embodiments presented herein.

FIG. 8A illustrates a view of a portion of a dual polarization antenna array 800 comprising a first subset of a plurality of single layer substrate antennas with exponentially tapered horizontal stub elements, with the antennas arranged in a plurality of first parallel planes. The view of the portion of the dual polarization antenna array 800 presents both surfaces (e.g., opposite surfaces, such as a distal surface and a mesial surface) of substrate 805, displaying antenna elements and walls present on both surfaces of substrate 805. The view of the portion of the dual polarization antenna array 800 displays a part of a first antenna 910 and a part of a second antenna 812. A vertical dashed line 815 represents the separation between first antenna 810 and second antenna 812.

The portion of dual polarization antenna array 800 includes a first antenna element 820, which is electrically coupled to signal feed 825, and a second antenna element 822. The portion of dual polarization antenna array 800 also includes a first wall 830 and a second wall 832. As shown in FIG. 8A, first wall 830 and second wall 832 are electrically coupled, forming a single large wall 835. In an embodiment, first wall 830 and second wall 832 are electrically decoupled. The portion of dual polarization antenna array 800 further includes a notch 840 that allows a corresponding portion of dual polarization antenna array comprising a second subset of a plurality of single layer substrate antennas arranged in a plurality of second parallel planes (an example is presented in FIG. 8B) to be fitted into an interlocking and orthogonal manner.

The antenna elements also include exponentially tapered horizontal stub elements, such as exponentially tapered horizontal stub elements 845 and 847. A gap, such as gap 849, is present between an exponentially tapered horizontal stub element and its corresponding antenna element. In an embodiment, the exponential taper of the exponentially tapered horizontal stub element matches the exponential taper of the antenna element. In another embodiment, the exponential taper of the exponentially tapered horizontal stub element does not match the exponential taper of the antenna element.

Figure 8B:
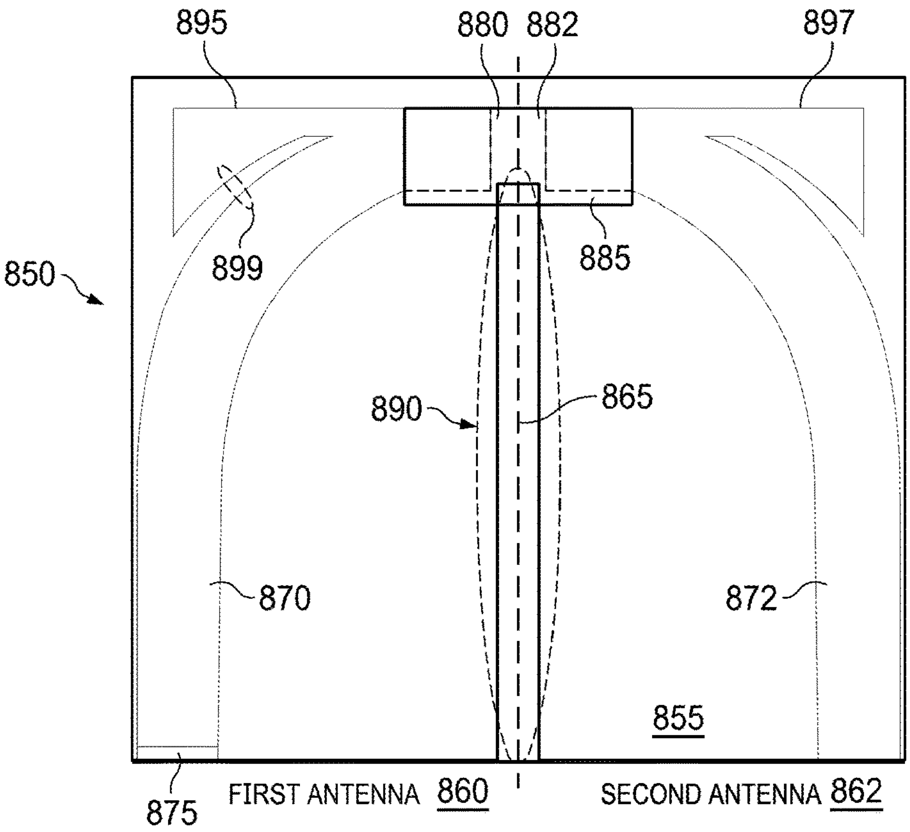
FIG. 8B illustrates a view of a portion of a dual polarization antenna array comprising a second subset of a plurality of single layer substrate antennas with exponentially tapered horizontal stub elements, with the antennas arranged in a plurality of second parallel planes according to example embodiments presented herein.

FIG. 8B illustrates a view of a portion of a dual polarization antenna array 850 comprising a second subset of a plurality of single layer substrate antennas with exponentially tapered horizontal stub elements, with the antennas arranged in a plurality of second parallel planes. The view of the portion of the dual polarization antenna array 850 presents both surfaces (e.g., opposite surfaces, such as a distal surface and a mesial surface) of substrate 855, displaying antenna elements and walls present on both surfaces of substrate 855. The view of the portion of the dual polarization antenna array 850 displays a part of a first antenna 860 and a part of a second antenna 862. A vertical dashed line 865 represents the separation between first antenna 860 and second antenna 862.

The portion of dual polarization antenna array 850 includes a first antenna element 870, which is electrically coupled to signal feed 875, and a second antenna element 872. The portion of dual polarization antenna array 850 also includes a first wall 880 and a second wall 882. As shown in FIG. 8B, first wall 980 and second wall 882 are electrically coupled, forming a single large wall 885. However, large wall 885 (hence, first wall 880 and second wall 882) is not electrically coupled to a ground plane. In an embodiment, first wall 880 and second wall 882 are electrically decoupled. The portion of dual polarization antenna array 850 further includes a notch 890 that allows a corresponding portion of dual polarization antenna array comprising the first subset of a plurality of single layer substrate antennas arranged in a plurality of first parallel planes (an example is presented in FIG. 8A) to be fitted into an interlocking and orthogonal manner. As an example, the portion of dual polarization antenna array 850 shown in FIG. 8B may slide over the portion of dual polarization antenna array 800 shown in FIG. 8A, with slot 890 fitting over and into slot 840 and form an interlocking and orthogonal antenna. An example is shown in FIG. 9.

The antenna elements also include exponentially tapered horizontal stub elements, such as exponentially tapered horizontal stub elements 895 and 897. A gap, such as gap 899, is present between an exponentially tapered horizontal stub element and its corresponding antenna element. In an embodiment, the exponential taper of the exponentially tapered horizontal stub element matches the exponential taper of the antenna element. In another embodiment, the exponential taper of the exponentially tapered horizontal stub element does not match the exponential taper of the antenna element.

Figure 9:
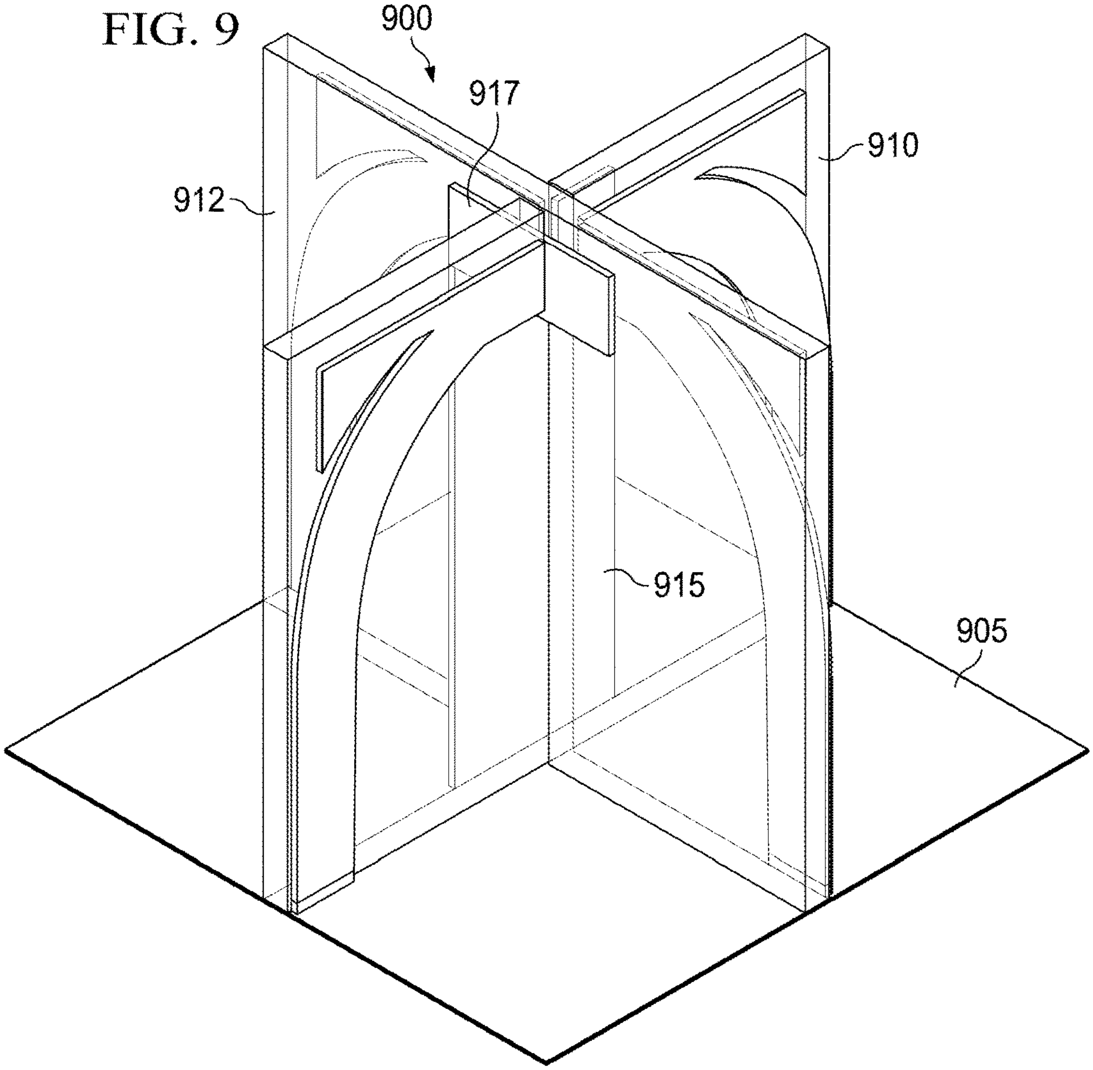
FIG. 9 illustrates an isometric view of a portion of a dual polarization antenna array, where the dual polarization antenna array features exponentially tapered horizontal stub elements according to example embodiments presented herein.

FIG. 9 illustrates an isometric view of a portion of a dual polarization antenna array 900, where the dual polarization antenna array 900 features exponentially tapered horizontal stub elements. As shown in FIG. 9, the portion of the dual polarization antenna array 900 includes a ground plane 905. On ground plane, a portion 910 of a plurality of single layer substrate antennas arranged in a plurality of first parallel planes is arranged in an interlocking and orthogonal manner with a portion 912 of a plurality of single layer substrate antennas arranged in a plurality of second parallel planes. In an embodiment, a large wall 915 of portion 910 is electrically coupled with a large wall 917 of portion 912. In an embodiment, large wall 915 of portion 910 is electrically decoupled from a large wall 917 of portion 912.

Although the dual polarization antenna array 900 is shown in FIG. 9 as having consistent horizontal stub element configurations with all of the horizontal stub elements being exponentially tapered in design, it is possible to have a dual polarization antenna array with differing horizontal stub element designs. As an example, a first subset of the plurality of single layer substrate antennas may have constant thickness horizontal stub elements, while a second subset of the plurality of single layer substrate antennas may have exponentially tapered horizontal stub elements. As an example, a first subset of the plurality of single layer substrate antennas may have exponentially tapered horizontal stub elements with a first exponential taper, while a second subset of the plurality of single layer substrate antennas may have exponentially tapered horizontal elements with a second exponential taper.

Although the horizontal stub element shown in FIGS. 8A, 8B, and 9 have a single exponential tapered design, other taper designs are possible. As an example, different exponential taper rates are possible, including different tapering curves, linear tapers, stepped tapers, etc.

Figure 10A:
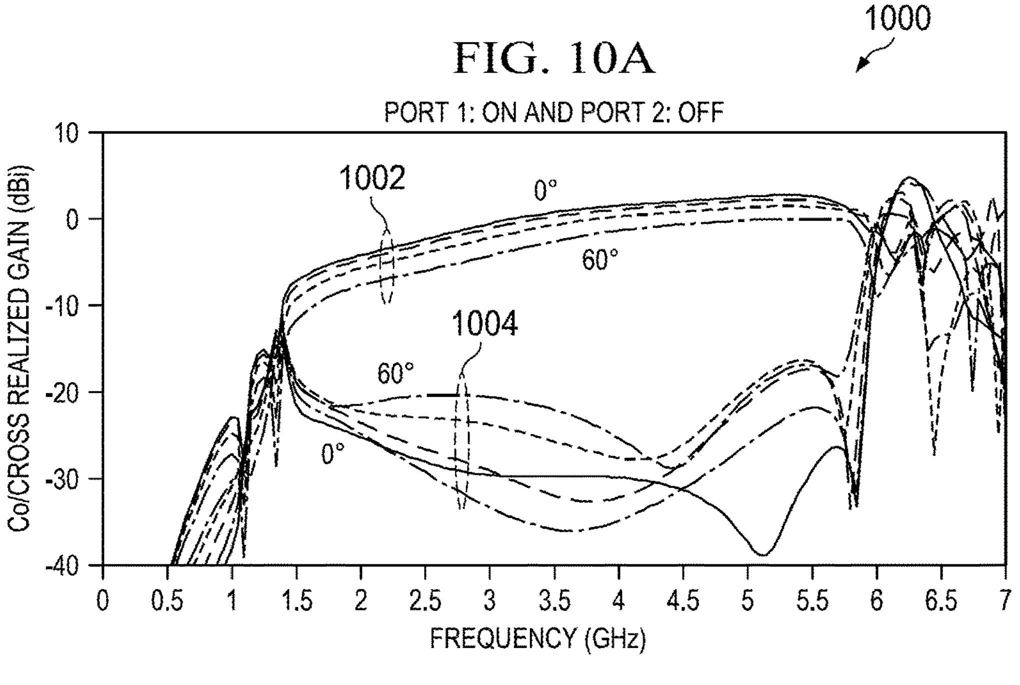
FIG. 10A illustrates a data plot of co-realized and cross-realized gain for the first signal with the first polarization when the second signal with the second polarization is inactive for a dual polarization antenna array comprising a plurality of single layer substrate antennas with tapered horizontal elements according to example embodiments presented herein.

FIG. 10A illustrates a data plot woo of co-realized and cross-realized gain for the first signal with the first polarization when the second signal with the second polarization is inactive for a dual polarization antenna array comprising a plurality of single layer substrate antennas with tapered horizontal elements. As shown in FIG. 10A, a first set of curves 1002 represents co-realized gain for angles −60 to +60 degrees with scanning being performed along a diagonal plane, while a second set of curves 1004 represents cross-realized gain for angles −60 to +60 degrees with scanning being performed along a diagonal plane. Cross-realized gain ranges from 10 to 40 dB less than co-realized gain over the frequency range.

FIG. 10B illustrates a data plot 1050 of co-realized and cross-realized gain for the second signal with the second polarization when the first signal with the first polarization is inactive for a dual polarization antenna array comprising a plurality of single layer substrate antennas with tapered horizontal elements. As shown in FIG. 10B, a first set of curves 1052 represents co-realized gain for angles −60 to +60 degrees with scanning being performed along a diagonal plane, while a second set of curves 1054 represents cross-realized gain for angles −60 to +60 degrees with scanning being performed along a diagonal plane. Cross-realized gain ranges from 10 to 40 dB less than co-realized gain over the frequency range.

According to an example embodiment, as described below in connection with FIGS. 11A, 11B, 12A, and 12B, the exponentially tapered second segments of the antenna elements of the single layer substrate antenna have different exponential tapers.

Figure 11B:
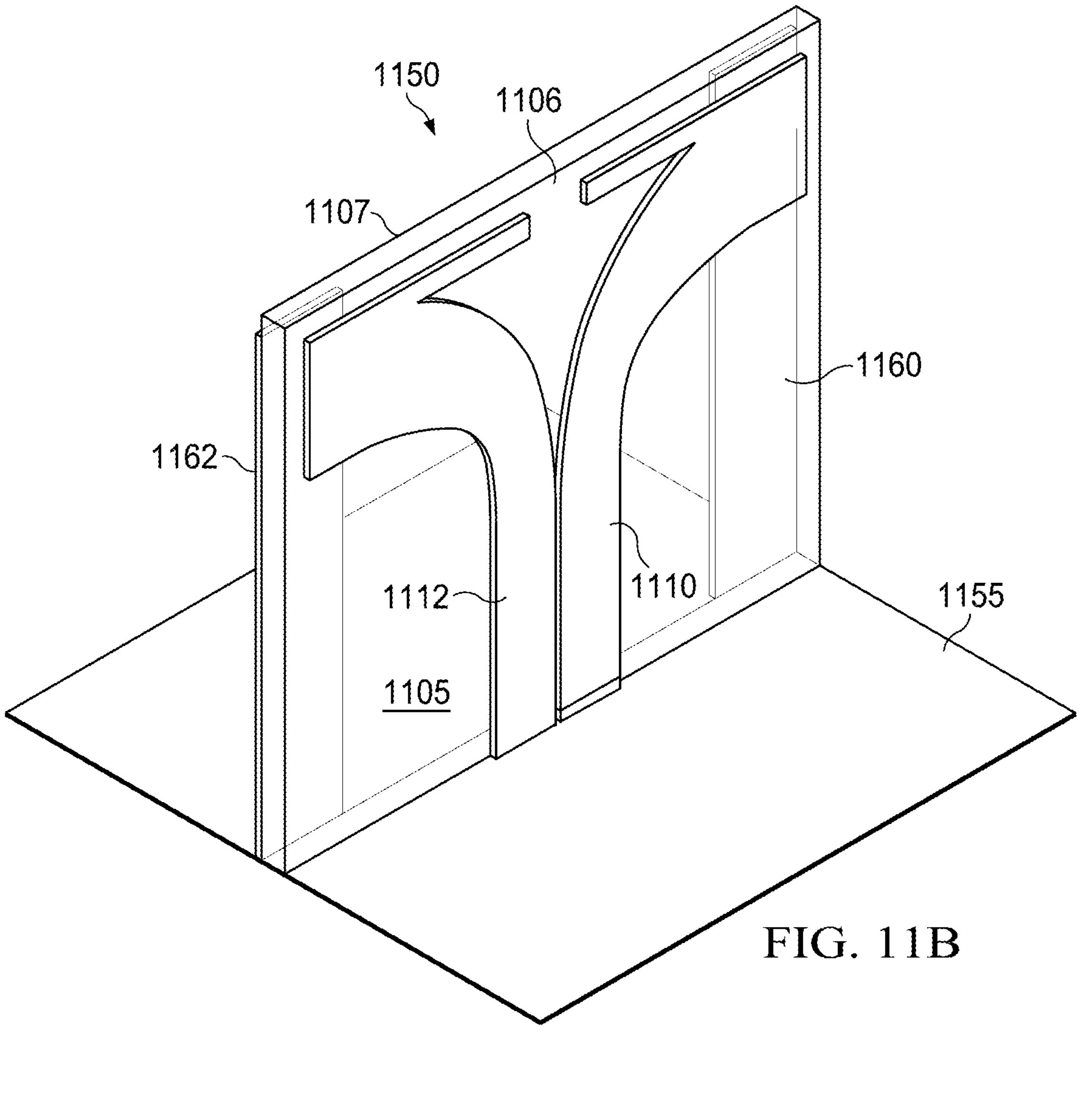

FIGS. 11A and 11B illustrate views of a first example single layer substrate antenna 1100 where exponentially tapered second segments of the single layer substrate antenna 1100 have different exponential tapers. FIG. 11A shows a view of a first surface 1106 of single layer substrate antenna 1100. As shown in FIG. 11A, single layer substrate antenna 1100 includes a first antenna element 1110 and a second antenna element 1112 disposed on a substrate 1105. First antenna element 1110 includes a first segment 1115 and a second segment 1120, as well as a horizontal stub element 1125. Second antenna element 1112 includes a first segment 1117 and a second segment 1122, as well as a horizontal stub element 1127. In an embodiment, second segments 1120 and 1122 of first antenna element 1110 and second antenna element 1112 have exponentially tapers, with different exponential tapers on top and bottom edges. In other words, the top edge has an exponential taper that is different from the exponential taper of the top edge. In an embodiment, second segments 1120 and 1122 have different exponential tapers for their respective top and bottom edges.

FIG. 11B illustrates an isometric view of single layer substrate antenna 1100. As shown in FIG. 11B, single layer substrate antenna 1100 includes first and second antenna elements 1110 and 1112 disposed on the first surface 1106 of substrate 1105, and first and second walls 1160 and 1162 disposed on a second surface 1107 of substrate 1105. Substrate 1105 is disposed on a ground plane 1155.

Figure 12A:
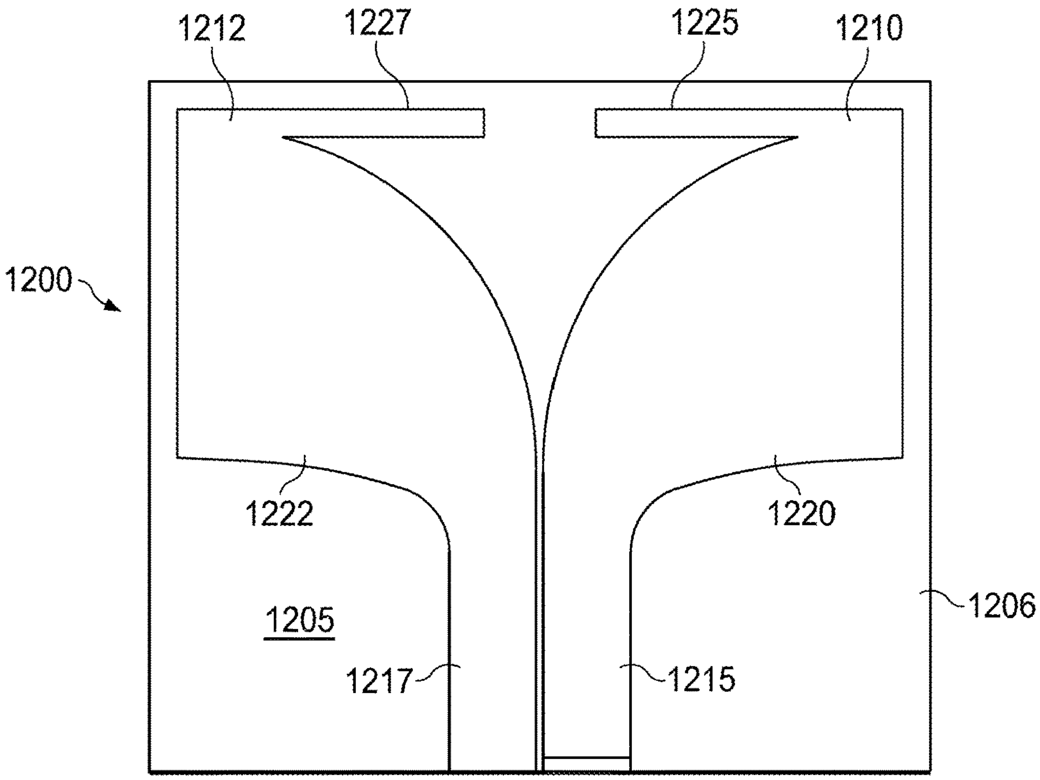
FIGS. 12A and 12B illustrate views of a second example single layer substrate antenna where exponentially tapered second segments of the single layer substrate antenna have different exponential tapers according to example embodiments presented herein.
Figure 12B:
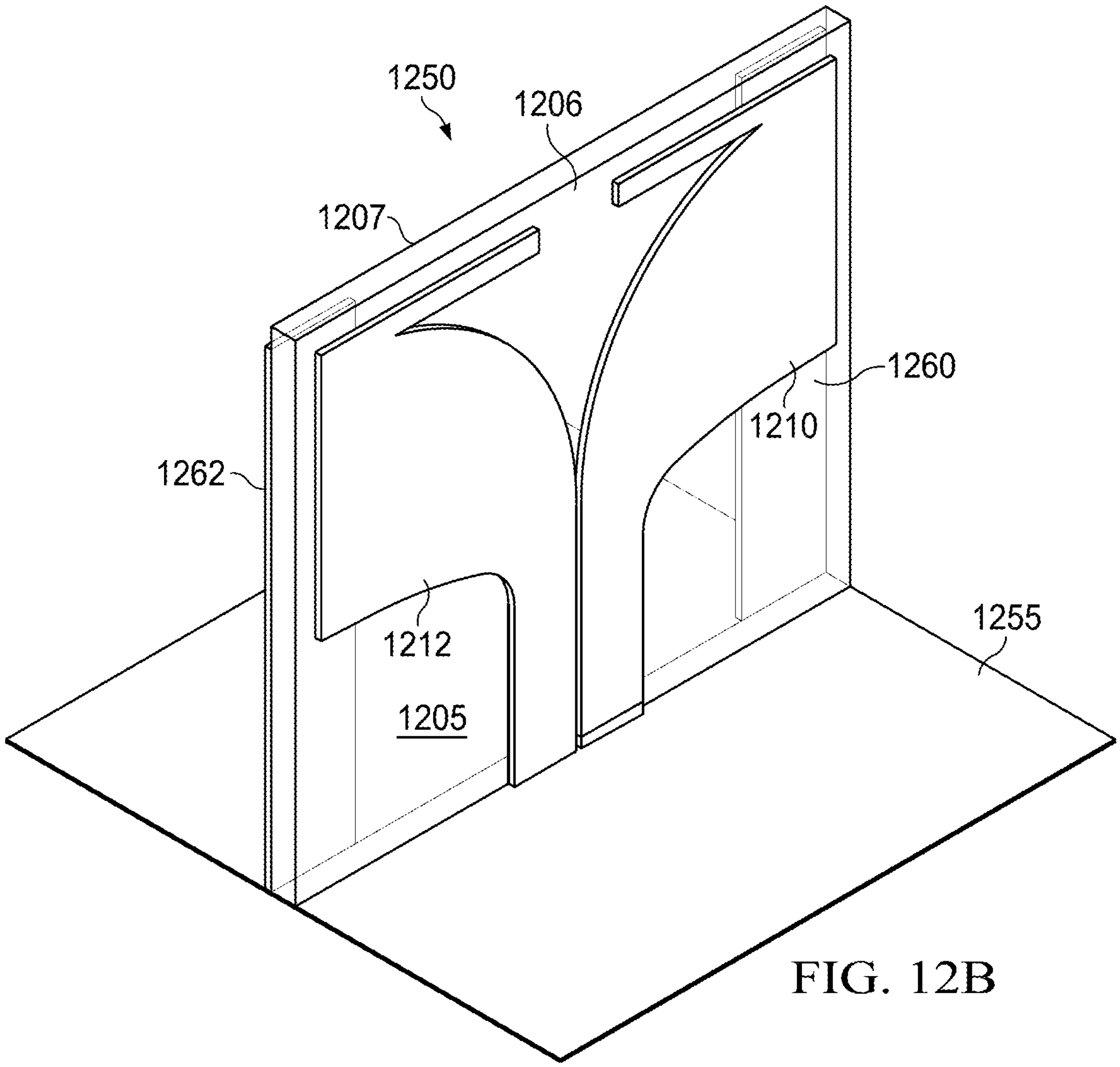

FIGS. 12A and 12B illustrate views of a second example single layer substrate antenna 1200 where exponentially tapered second segments of the single layer substrate antenna 1200 have different exponential tapers. FIG. 12A shows a view of a first surface 1206 of single layer substrate antenna 1200. As shown in FIG. 12A, single layer substrate antenna 1200 includes a first antenna element 1210 and a second antenna element 1212 disposed on a substrate 1205. First antenna element 1210 includes a first segment 1215 and a second segment 1220, as well as a horizontal stub element 1225. Second antenna element 1212 includes a first segment 1217 and a second segment 1222, as well as a horizontal stub element 1227. In an embodiment, second segments 1220 and 1222 of first antenna element 1210 and second antenna element 1212 have exponentially tapers, but the exponential tapers of second segments 1220 and 1222 are different from the exponential tapers of second segments 1120 and 1122.

FIG. 12B illustrates an isometric view of single layer substrate antenna 1200. As shown in FIG. 12B, single layer substrate antenna 1200 includes first and second antenna elements 1210 and 1212 disposed on the first surface 1206 of substrate 1205, and first and second walls 1260 and 1262 disposed on a second surface 1207 of substrate 1205. Substrate 1205 is disposed on a ground plane 1255.

According to an example embodiment, as described below in connection with FIGS. 13A, 13B, 14A, 14B, 15A, and 15B, the antenna elements of the single layer substrate antenna include a plurality of horizontal stub elements.

Figure 13A:
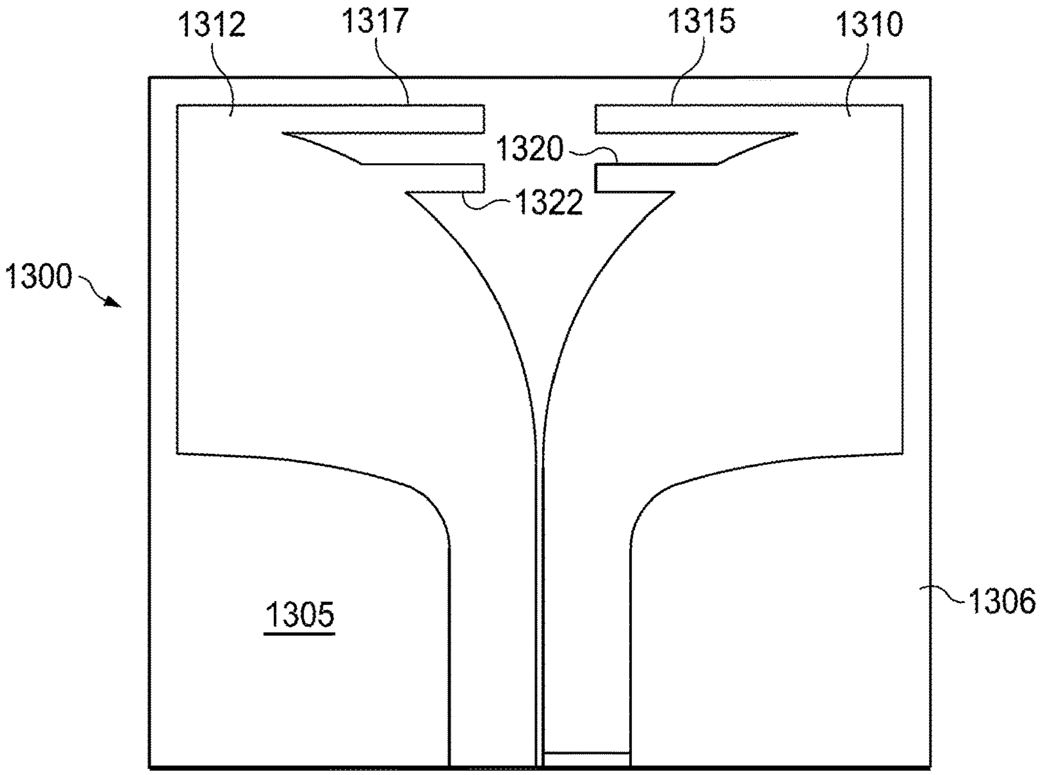
FIGS. 13A and 13B illustrate views of a third example single layer substrate antenna where antenna elements of single layer substrate antenna each have two horizontal stub elements according to example embodiments presented herein.
Figure 13B:
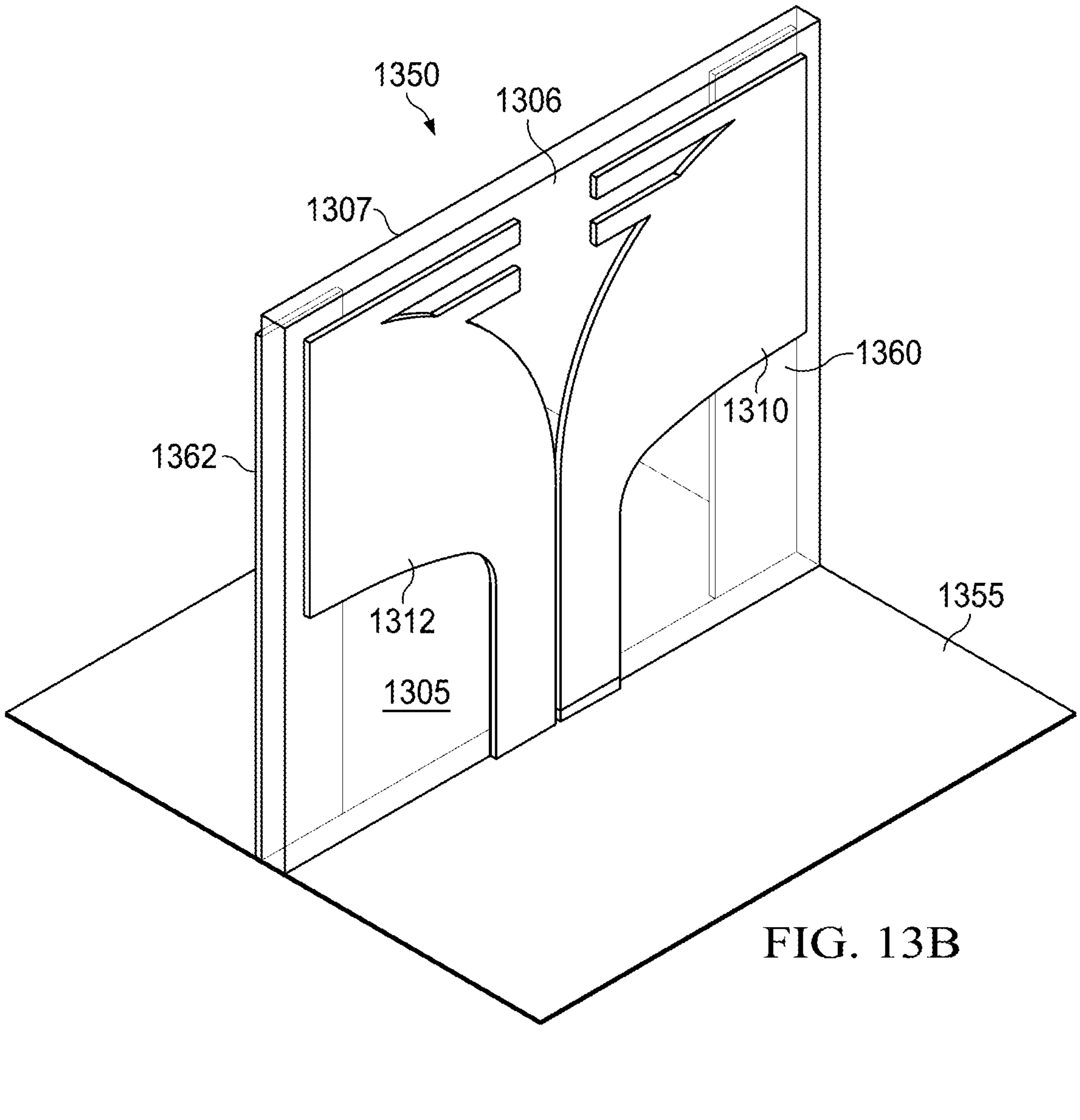

FIGS. 13A and 13B illustrate views of a third example single layer substrate antenna 1300 where antenna elements of single layer substrate antenna 1300 each have two horizontal stub elements. FIG. 13A shows a view of a first surface 1306 of single layer substrate antenna 1300. As shown in FIG. 13A, single layer substrate antenna 1300 includes a first antenna element 1310 and a second antenna element 1312 disposed on a substrate 1305. First antenna element 1310 includes two horizontal stub elements 1315 and 1320. Second antenna element 1312 includes two horizontal stub elements 1317 and 1322.

FIG. 13B illustrates an isometric view of single layer substrate antenna 1300. As shown in FIG. 13B, single layer substrate antenna 1300 includes first and second antenna elements 1310 and 1312 disposed on the first surface 1306 of substrate 1305, and first and second walls 1360 and 1362 disposed on a second surface 1307 of substrate 1305. Substrate 1305 is disposed on a ground plane 1355.

Figure 14A:
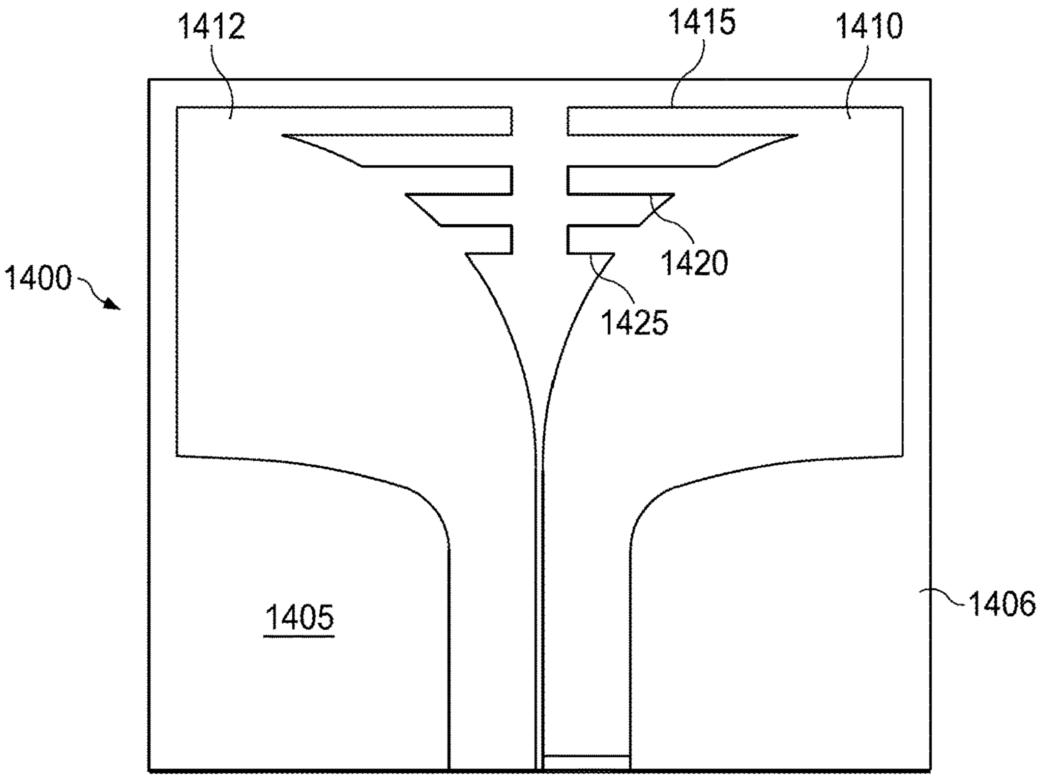
FIGS. 14A and 14B illustrate views of a fourth example single layer substrate antenna where antenna elements of single layer substrate antenna each have three horizontal stub elements according to example embodiments presented herein.
Figure 14B:
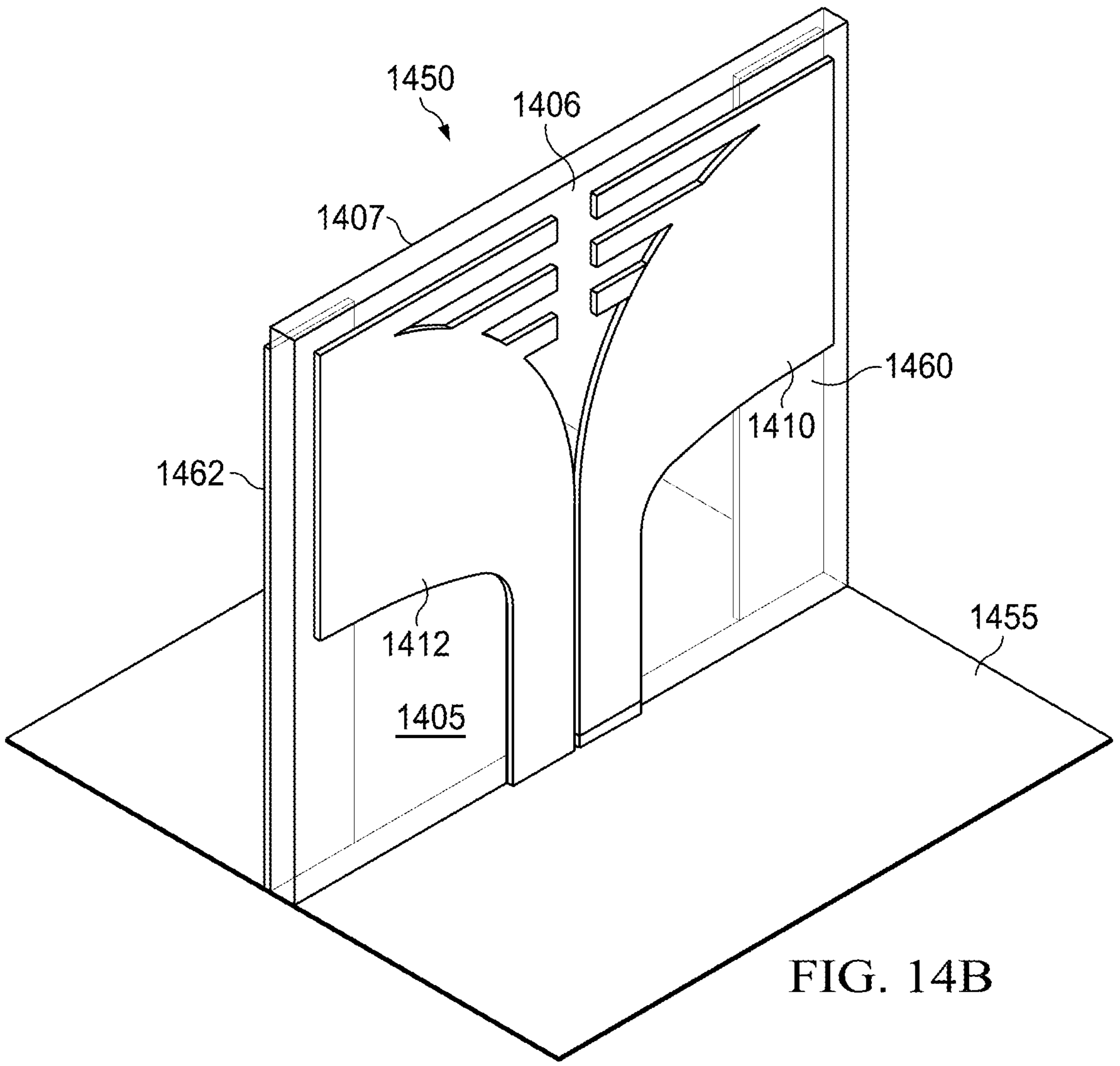

FIGS. 14A and 14B illustrate views of a fourth example single layer substrate antenna 1400 where antenna elements of single layer substrate antenna 1400 each have three horizontal stub elements. FIG. 14A shows a view of a first surface 1406 of single layer substrate antenna 1400. As shown in FIG. 14A, single layer substrate antenna 1400 includes a first antenna element 1410 and a second antenna element 1412 disposed on a substrate 1405. First antenna element 1410 includes three horizontal stub elements 1415, 1420, and 1425. Second antenna element 1312 also includes three horizontal stub elements.

FIG. 14B illustrates an isometric view of single layer substrate antenna 1400. As shown in FIG. 14B, single layer substrate antenna 1400 includes first and second antenna elements 1410 and 1412 disposed on the first surface 1406 of substrate 1405, and first and second walls 1460 and 1462 disposed on a second surface 1407 of substrate 1405. Substrate 1405 is disposed on a ground plane 1455.

Figure 15A:
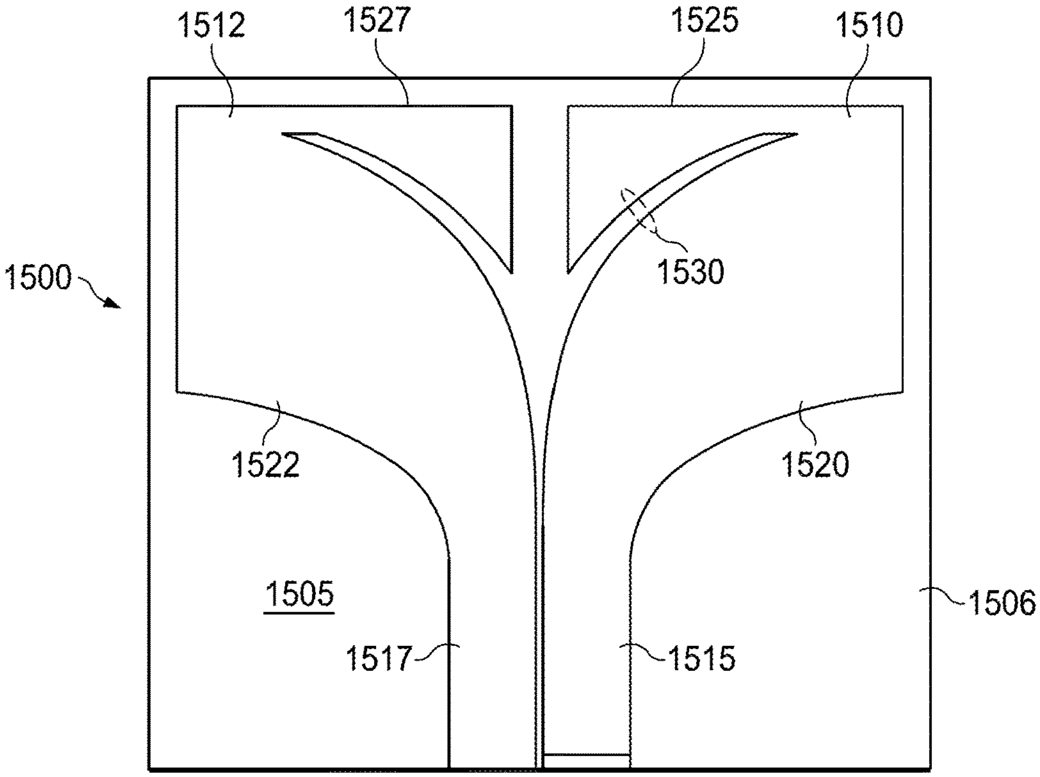
FIGS. 15A and 15B illustrate views of a fifth example single layer substrate antenna where antenna elements of single layer substrate antenna each have a horizontal stub element with an exponential taper according to example embodiments presented herein.
Figure 15B:
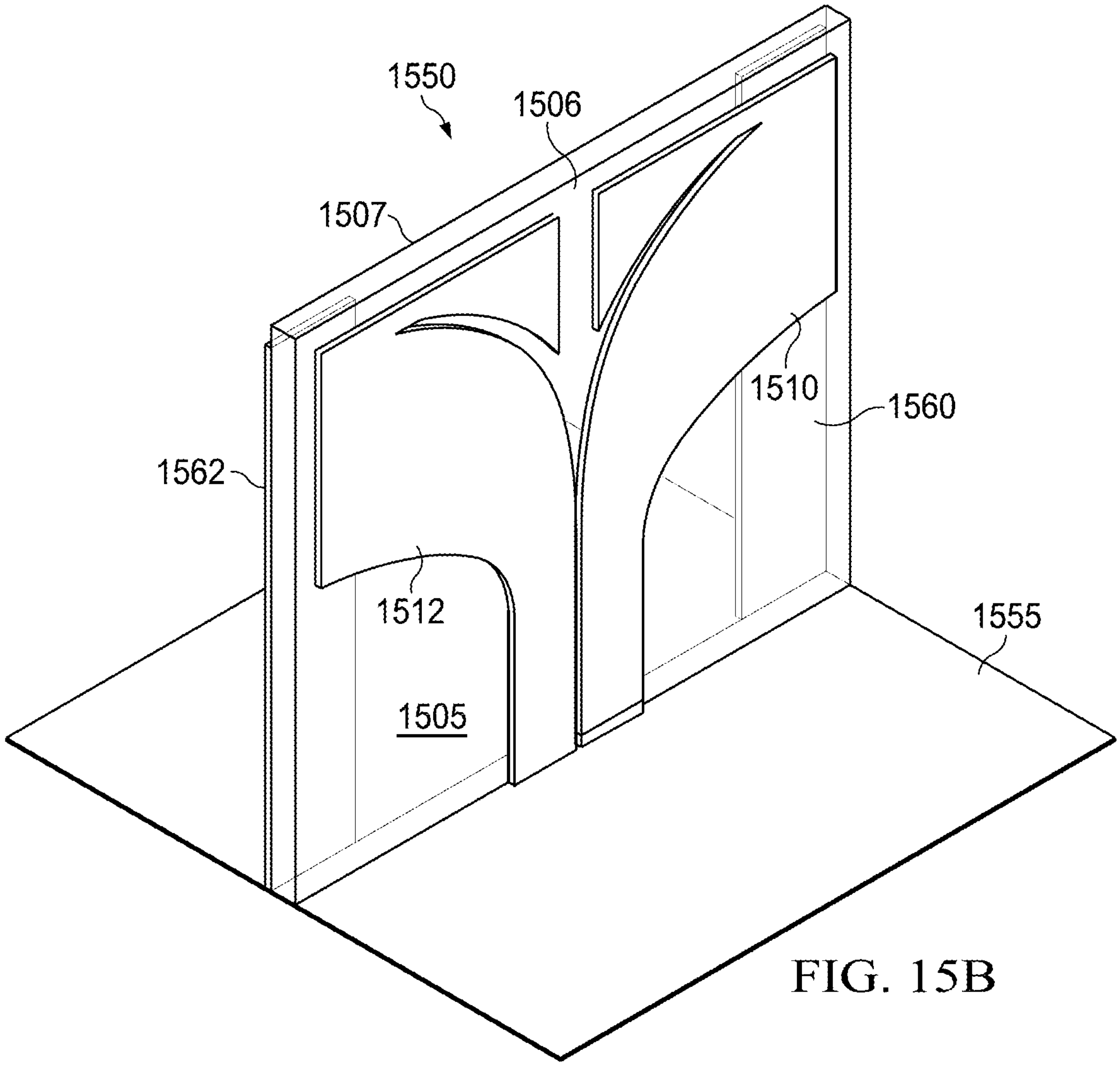

FIGS. 15A and 15B illustrate views of a fifth example single layer substrate antenna 1500 where antenna elements of single layer substrate antenna 1500 each have a horizontal stub element with an exponential taper. FIG. 15A shows a view of a first surface 1506 of single layer substrate antenna 1500. As shown in FIG. 15A, single layer substrate antenna 1500 includes a first antenna element 1510 and a second antenna element 1512 disposed on a substrate 1505. First antenna element 1510 includes a first segment 1515 and a second segment 1520, as well as a horizontal stub element 1525. Second antenna element 1512 includes a first segment 1517 and a second segment 1522, as well as a horizontal stub element 1527. Horizontal stub elements 1525 and 1527 have exponential tapers. A gap, such as gap 1530, is present between a horizontal stub element and its antenna element. The gap may be a constant width gap or it may change over the length of the horizontal stub element. In an embodiment, horizontal stub elements 1525 and 1527 have the same exponential taper. In an embodiment, horizontal stub elements 1525 and 1527 have different exponential tapers.

FIG. 15B illustrates an isometric view of single layer substrate antenna 1500. As shown in FIG. 15B, single layer substrate antenna 1500 includes first and second antenna elements 1510 and 1512 disposed on the first surface 1506 of substrate 1505, and first and second walls 1560 and 1562 disposed on a second surface 1507 of substrate 1505. Substrate 1505 is disposed on a ground plane 1555.

In an embodiment, a height of the dual polarization antenna array is less than one-half of the wavelength of the highest operating frequency. As an example, the height of the dual polarization antenna array is approximately 0.4 times the wavelength of the highest operating frequency. Other values are possible. In another embodiment, the lateral dimension of each single substrate antenna element in the dual polarization antenna array is approximately one-half of the wavelength of the highest operating frequency. As an example, the lateral dimension of each single substrate antenna element in the dual polarization antenna array is approximately 0.5 times the wavelength of the highest operating frequency. Other values are possible. As an example, the lateral dimension of each single substrate antenna element in the dual polarization antenna array is approximately 0.5 (but less than 0.53) times the wavelength of the highest operating frequency. Other values are possible.

In an embodiment, the single layer substrate antennas and the antenna arrays formed from the single layer substrate antenna are monolithically fabricated. The single layer substrate antennas and the antenna arrays formed from the single layer substrate antenna may be formed using a three-dimensional (3D) printing or additive manufacturing techniques, for example. In 3D printing, including vat photopolymerization, powder bed fusion, material extrusion, sheet lamination, directed energy deposition, material jetting, and binder jetting methods, the parts and structures are formed layer by layer. 3D printing allows for the formation of complex geometric shapes that can be mass customized, because no die or mold is required and design concepts are translated into products through direct digital manufacturing. Furthermore, the additively layered approach enables the merging of multiple components into a single piece, which removes the requirement for subsequent assembly operations.

Figure 16A:
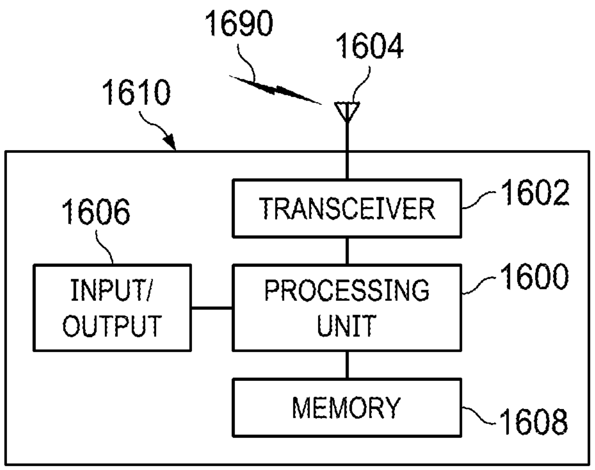
FIGS. 16A and 16B illustrate example devices that may implement the methods and teachings according to this disclosure.
Figure 16B:
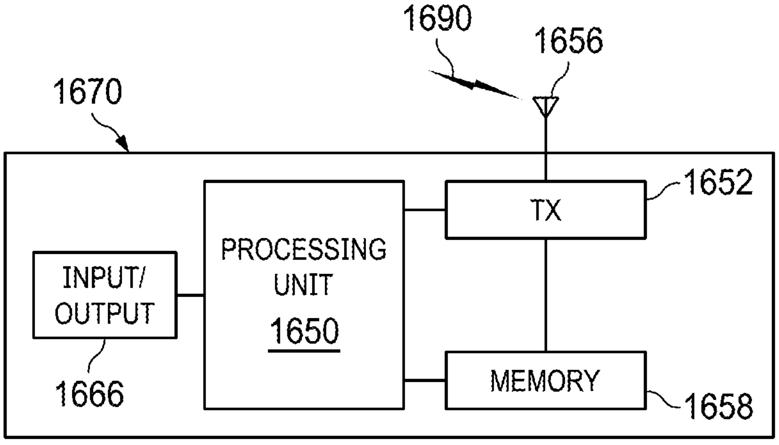

FIGS. 16A and 16B illustrate example devices that may implement the methods and teachings according to this disclosure. In particular, FIG. 16A illustrates an example electronic device (ED) 1610, and FIG. 16B illustrates an example base station 1670. These components could be used in a system.

As shown in FIG. 16A, the ED 1610 includes at least one processing unit 1600. The processing unit 1600 implements various processing operations of the ED 1610. For example, the processing unit 1600 could perform signal coding, data processing, power control, input/output processing, or any other functionality enabling the ED 1610 to operate in the system. The processing unit 1600 also supports the methods and teachings described in more detail above. Each processing unit 1600 includes any suitable processing or computing device configured to perform one or more operations. Each processing unit 1600 could, for example, include a microprocessor, microcontroller, digital signal processor, field programmable gate array, or application specific integrated circuit.

The ED 1610 also includes at least one transceiver 1602. The transceiver 1602 is configured to modulate data or other content for transmission by at least one antenna or NIC (Network Interface Controller) 1604. The at least one antenna 1604 may be a single layer substrate antenna or an antenna array comprised of single layer substrate antennas, as described herein. The transceiver 1602 is also configured to demodulate data or other content received by the at least one antenna 1604. Each transceiver 1602 includes any suitable structure for generating signals for wireless or wired transmission or processing signals received wirelessly or by wire. Each antenna 1604 includes any suitable structure for transmitting or receiving wireless or wired signals. One or multiple transceivers 1602 could be used in the ED 1610, and one or multiple antennas 1604 could be used in the ED 1610. Although shown as a single functional unit, a transceiver 1602 could also be implemented using at least one transmitter and at least one separate receiver.

The ED 1610 further includes one or more input/output devices 1606 or interfaces (such as a wired interface to the Internet). The input/output devices 1606 facilitate interaction with a user or other devices (network communications) in the network. Each input/output device 1606 includes any suitable structure for providing information to or receiving information from a user, such as a speaker, microphone, keypad, keyboard, display, or touch screen, including network interface communications.

In addition, the ED 1610 includes at least one memory 1608. The memory 1608 stores instructions and data used, generated, or collected by the ED 1610. For example, the memory 1608 could store software or firmware instructions executed by the processing unit(s) 1600 and data used to reduce or eliminate interference in incoming signals. Each memory 1608 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16B, the base station 1670 includes at least one processing unit 1650, at least one transceiver 1652, which includes functionality for a transmitter and a receiver, one or more antennas 1656, at least one memory 1658, and one or more input/output devices or interfaces 1666. The at least one antenna 1656 may be a single layer substrate antenna or an antenna array comprised of single layer substrate antennas, as described herein. A scheduler, which would be understood by one skilled in the art, is coupled to the processing unit 1650. The scheduler could be included within or operated separately from the base station 1670. The processing unit 1650 implements various processing operations of the base station 1670, such as signal coding, data processing, power control, input/output processing, or any other functionality. The processing unit 1650 can also support the methods and teachings described in more detail above. Each processing unit 1650 includes any suitable processing or computing device configured to perform one or more operations. Each processing unit 1650 could, for example, include a microprocessor, microcontroller, digital signal processor, field programmable gate array, or application specific integrated circuit.

Each transceiver 1652 includes any suitable structure for generating signals for wireless or wired transmission to one or more EDs or other devices. Each transceiver 1652 further includes any suitable structure for processing signals received wirelessly or by wire from one or more EDs or other devices. Although shown combined as a transceiver 1652, a transmitter and a receiver could be separate components. Each antenna 1656 includes any suitable structure for transmitting or receiving wireless or wired signals. While a common antenna 1656 is shown here as being coupled to the transceiver 1652, one or more antennas 1656 could be coupled to the transceiver(s) 1652, allowing separate antennas 1656 to be coupled to the transmitter and the receiver if equipped as separate components. Each memory 1658 includes any suitable volatile or non-volatile storage and retrieval device(s). Each input/output device 1666 facilitates interaction with a user or other devices (network communications) in the network. Each input/output device 1666 includes any suitable structure for providing information to or receiving/providing information from a user, including network interface communications.

Although the present disclosure and its advantages have been described in detail, it should be understood that various changes, substitutions and alterations can be made herein without departing from the spirit and scope of the disclosure as defined by the appended claims.

What is claimed is:

1. A modular wideband antenna comprising:

a ground plane;

a first antenna element and a second antenna element disposed on a first surface of a substrate, the first antenna element is electrically coupled to the ground plane, a first segment of the first antenna element extends parallel to a first segment of the second antenna element along the substrate and a second segment of the first antenna element diverges from a second segment of the second antenna element along the substrate, the second antenna element is coupled to a signal feed, the first antenna element has a first horizontal stub element electrically coupled to a second section of the first antenna element, and the second antenna element has a second horizontal stub element electrically coupled to the second section of the second antenna element; and a first wall and a second wall disposed on a second surface of the substrate, the first wall having a first end electrically coupled to the ground plane, the second wall having a first end electrically coupled to the ground plane, the first wall being capacitively coupled to the first antenna element and the second wall being electrically coupled to the second antenna element.

2. The modular wideband antenna of claim 1, wherein the first horizontal stub element and the second horizontal stub element are horizontal stubs.

3. The modular wideband antenna of claim 2, wherein the horizontal stubs have constant width.

4. The modular wideband antenna of claim 1, wherein the first horizontal stub element and the second horizontal stub element are exponentially tapered, and form a gap with respective second sections.

5. The modular wideband antenna of claim 4, wherein the exponential taper of the first horizontal stub element and the second horizontal stub element match an exponential taper of the respective second sections of the first antenna element and the second antenna element.

6. The modular wideband antenna of claim 1, wherein the first antenna element, the second antenna element, the first horizontal stub element, and the second horizontal stub element comprise a first metallization layer.

7. The modular wideband antenna of claim 1, wherein the first wall and the second wall comprise a second metallization layer.

8. The modular wideband antenna of claim 1, wherein the first antenna element and the second antenna element are substantially equal in width.

9. The modular wideband antenna of claim 1, wherein the first horizontal stub element and the second horizontal stub element are substantially equal in width.

10. The modular wideband antenna of claim 1, wherein the first wall and the second wall are substantially equal in width.

11. The modular wideband antenna of claim 1, wherein the substrate is a single layer substrate.

12. An antenna array comprising:

a ground plane; and a plurality of modular wideband antennas, each modular wideband antenna comprising, a first antenna element and a second antenna element disposed on a first surface of a substrate, the first antenna element is electrically coupled to the ground plane, a first segment of the first antenna element extends parallel to a first segment of the second antenna element along the substrate and a second segment of the first antenna element diverges from a second segment of the second antenna element along the substrate, the second antenna element being coupled to a signal feed, the first antenna element having a first horizontal stub element electrically coupled to a second section of the first antenna element, and the second antenna element having a second horizontal stub element electrically coupled to the second section of the second antenna element, and a first wall and a second wall disposed on a second surface of the substrate, the first wall being capacitively coupled to the first antenna element and the second wall being electrically coupled to the second antenna element.

13. The antenna array of claim 12, wherein the antenna array comprises a single polarized array, and the first antenna element and the second antenna element are arranged in a plurality of parallel planes.

14. The antenna array of claim 12, wherein the antenna array comprises a dual polarized array, first elements and second elements of a first subset of the plurality of modular wideband antennas are arranged in a plurality of first parallel planes, and first elements and second elements of a second subset of the plurality of modular wideband antennas are arranged in a plurality of second parallel planes.

15. The antenna array of claim 14, wherein the first parallel planes and the second parallel planes are orthogonal.

16. The antenna array of claim 15, wherein the first parallel planes and the second parallel planes are arranged along a diagonal of the ground plane.

17. The antenna array of claim 14, wherein first walls of the first subset of the plurality of modular wideband antennas are electrically coupled to second walls of the first subset of the plurality of modular wideband antennas, and first walls of the second subset of the plurality of modular wideband antennas are electrically coupled to second walls of the second subset of the plurality of modular wideband antennas.

18. The antenna array of claim 17, wherein the first walls and the second walls of the first subset of the plurality of modular wideband antennas are electrically coupled to the first walls and the second walls of the second subset of the plurality of modular wideband antennas.

19. The antenna array of claim 17, wherein the first walls and the second walls of the first subset of the plurality of modular wideband antennas are electrically decoupled from the first walls and the second walls of the second subset of the plurality of modular wideband antennas.

20. The antenna array of claim 12, wherein the first walls and the second walls of a first subset of the plurality of modular wideband antennas are electrically coupled to the ground plane.

21. The antenna array of claim 12, wherein the substrate comprises a single layer substrate.

22. The antenna array of claim 12, wherein orientations of the substrates of plurality of modular wideband antennas are diagonal to an orientation of the antenna array.

23. The antenna array of claim 12, wherein the antenna array is fabricated using a three-dimensional printing process.

* * * * *